United States Patent
Sudo et al.

(10) Patent No.: US 8,130,243 B2
(45) Date of Patent: Mar. 6, 2012

(54) IMAGE DISPLAY CONTROL APPARATUS AND METHOD

(75) Inventors: Koji Sudo, Machida (JP); Chiyumi Niwa, Kawasaki (JP); Nobukazu Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 889 days.

(21) Appl. No.: 12/166,818

(22) Filed: Jul. 2, 2008

(65) Prior Publication Data

US 2009/0009531 A1 Jan. 8, 2009

(30) Foreign Application Priority Data

Jul. 3, 2007 (JP) ................. 2007-175291

(51) Int. Cl.
*G09G 5/00* (2006.01)
*G03B 13/18* (2006.01)

(52) U.S. Cl. .................. 345/632; 348/333.02; 396/123

(58) Field of Classification Search .................. 345/632, 345/634, 635; 396/123; 348/333.02, 333.03
See application file for complete search history.

(56) References Cited

U.S. PATENT DOCUMENTS

2007/0263997 A1* 11/2007 Hirai et al. .................. 396/123

2008/0232713 A1 9/2008 Iizuka

FOREIGN PATENT DOCUMENTS

| CN | 1839411 | 9/2006 |
|---|---|---|
| JP | 2005-295418 A | 10/2005 |
| JP | 2005-311888 A | 11/2005 |
| JP | 2006-330211 | 12/2006 |

OTHER PUBLICATIONS

Matthew Gaubatz and Robert Ulichney; Automatic Red-Eye Detection and Correction; Dec. 10, 2002; Proceedings of International Conference on Image Processing 2002, IEEE ICIP 2002; vol. 1; pp. I-804-I-807.*

* cited by examiner

*Primary Examiner* — Jeffery A Brier
(74) *Attorney, Agent, or Firm* — Canon USA Inc. IP Division

(57) ABSTRACT

A degree of overlapping between separately obtained regions of respective parts of an image is determined. When the degree of overlapping is greater than a defined value, only one of the obtained regions, or both the regions, or a region including both the regions is selected. When the degree of overlapping is less than the defined value, the separately obtained regions of respective parts of the image are separately selected. The image is displayed while reflecting a result of the selection.

13 Claims, 27 Drawing Sheets

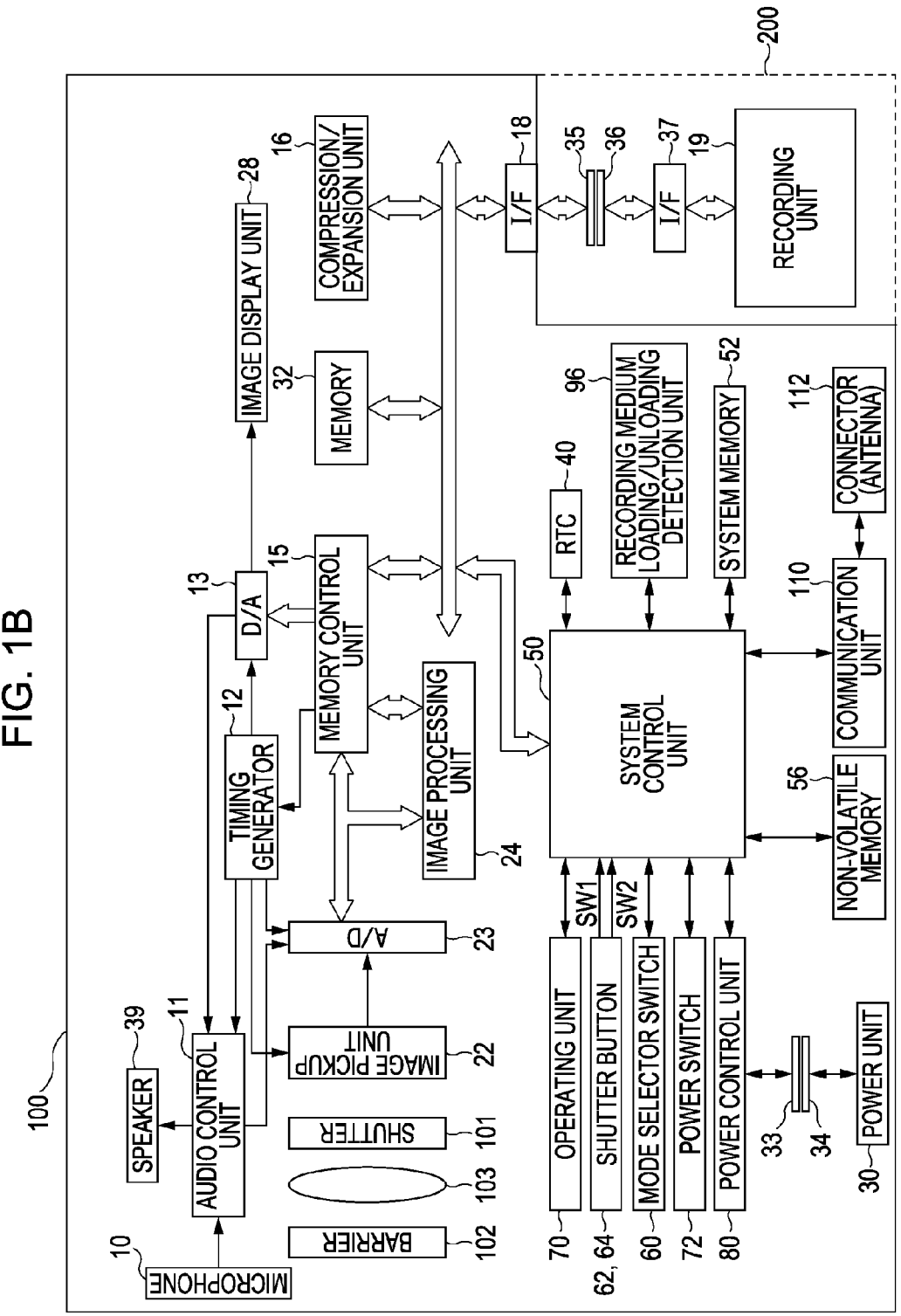

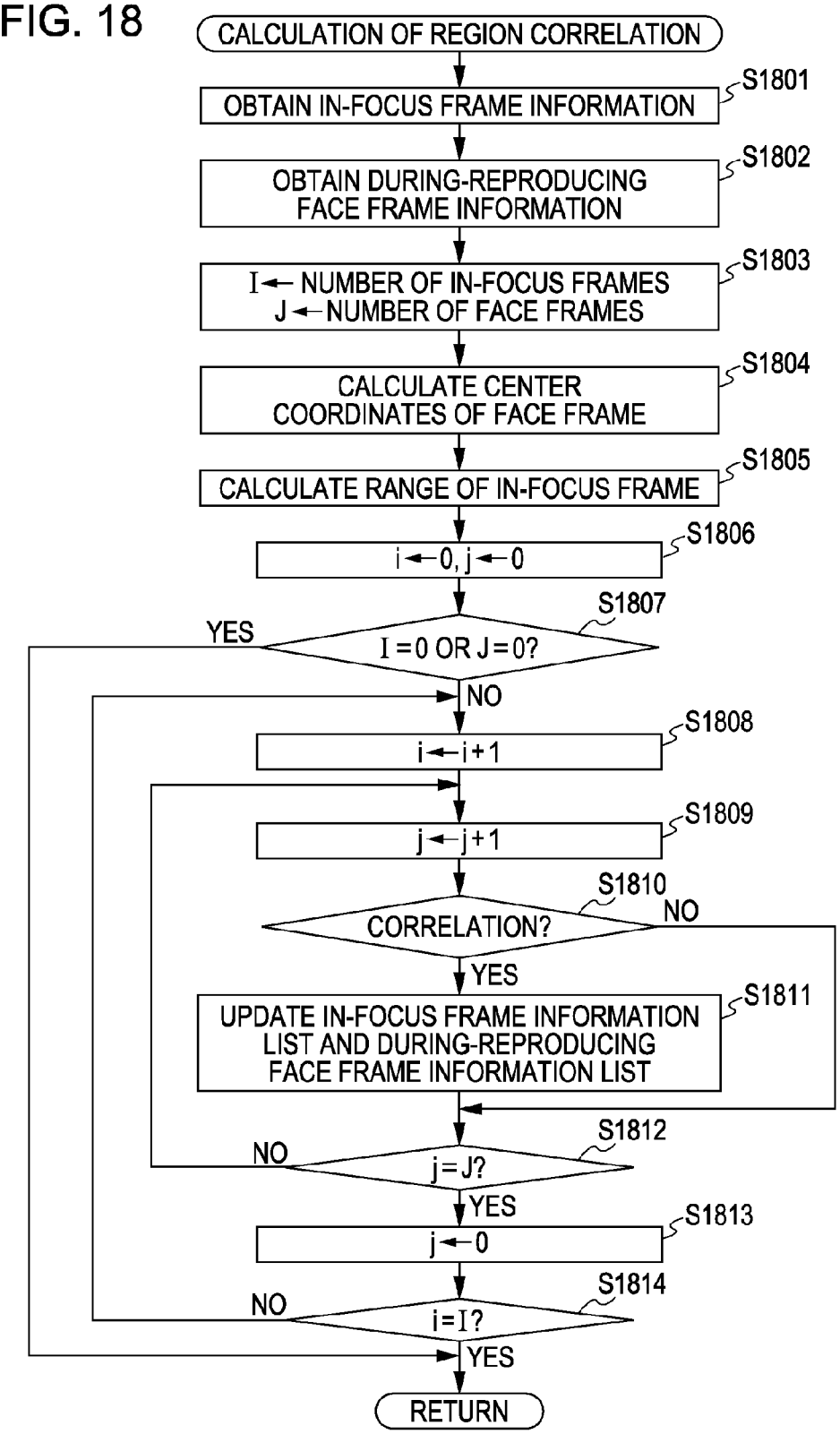

| IN-FOCUS FRAME i (1901) | POSITION OF IN-FOCUS FRAME (1902) | ... (1903) | JUMP TARGET (1904) | DISPLAY TARGET (1905) |
|---|---|---|---|---|
| 1 | 50,100 | | ○ | ○ |
| 2 | 200,80 | | ○ | ○ |
| 3 | 300,75 | | ○ | ○ |

| FACE FRAME j (1911) | POSITION OF FACE FRAME (1912) | ... (1913) | JUMP TARGET (1914) | DISPLAY TARGET (1915) |
|---|---|---|---|---|
| 1 | 50,200 | | ○ | ○ |
| 2 | 250,78 | | × | × |
| 3 | 350,73 | | × | × |

IMAGE DISPLAY CONTROL APPARATUS AND METHOD

BACKGROUND OF THE INVENTION

1. Field of the Invention

The present invention relates to an image display control apparatus and method adapted to display an image, and also relates to a recording medium in which a program is recorded.

2. Description of the Related Art

Recently, techniques have been proposed to display frames serving various purposes, each frame corresponding to a region of an image. For example, an in-focus frame represents a region of an image which has selected for focus adjustment at the time of shooting the image, and a face frame indicating a region of an image where a face has been detected by an image analysis, in an superimposed relation to the image and/or in an enlarged size.

For example, Japanese Patent Laid-Open No. 2005-295418 describes the following technique. An object and an in-focus frame are displayed in an overlapped relation at the time of shooting, and a region of the in-focus frame in an image is displayed in an enlarged size when the image is reproduced. Further, plural in-focus regions positioned close to each other are enlarged together. Accordingly, even when there are plural in-focus frames, the number of steps can be reduced which are required for displaying images while enlarging the plural in-focus frames.

Also, Japanese Patent Laid-Open No. 2005-311888 describes the following technique. From an image displayed on a screen, a target object, e.g., a human face, is detected and displayed in an enlarged size, and a frame is displayed for the target object that is displayed in an enlarged size in an entire image. In addition, when there are plural target objects positioned close to each other in the image, those objects are classified as the same set and each set is displayed in an enlarged size.

The above-described related art is intended to confirm only the in-focus frame or only the face frame. In some cases, however, separately extracted regions, e.g., the in-focus frame and the face frame, represent substantially the same object. When those regions are independently confirmed without taking into account correlation between the regions as in the related art, efficient confirmation of the regions cannot be realized.

SUMMARY OF THE INVENTION

An embodiment of the present invention provides an image display control apparatus which can display separately extracted regions in such a manner as enabling those regions to be efficiently confirmed.

According to an embodiment of the present invention, there is provided an image display control apparatus including a first region obtaining unit adapted to obtain a first region of an image, a second region obtaining unit adapted to obtain a second region of an image, which differs from the first region, a determination unit adapted to determine a degree of overlapping between the first region and the second region, a selection unit adapted to select only one of the first region and the second region, or both the regions at the same time, or a region including both the regions, when the determination unit determines that the degree of overlapping between the first region and the second region is greater than a defined value, the selection unit being adapted to separately select the first region and the second region when the determination unit determines that the degree of overlapping between the first region and the second region is less than the defined value, and a display control unit adapted to perform control to display the image while reflecting a selection result by the selection unit.

With an embodiment of the present invention, a user can efficiently confirm the separately extracted regions.

This summary of the invention does not necessarily describe all necessary features so that the invention may also be a sub-combination of these described features.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 1B is a block diagram of the digital camera as an example of the image display control apparatus according to the exemplary embodiment of the present invention.

FIG. 18 is a flowchart illustrating an area correlation calculation process in the exemplary embodiment of the present invention.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

(Construction of Digital Camera)

(a) External Appearance

Figure 1A:
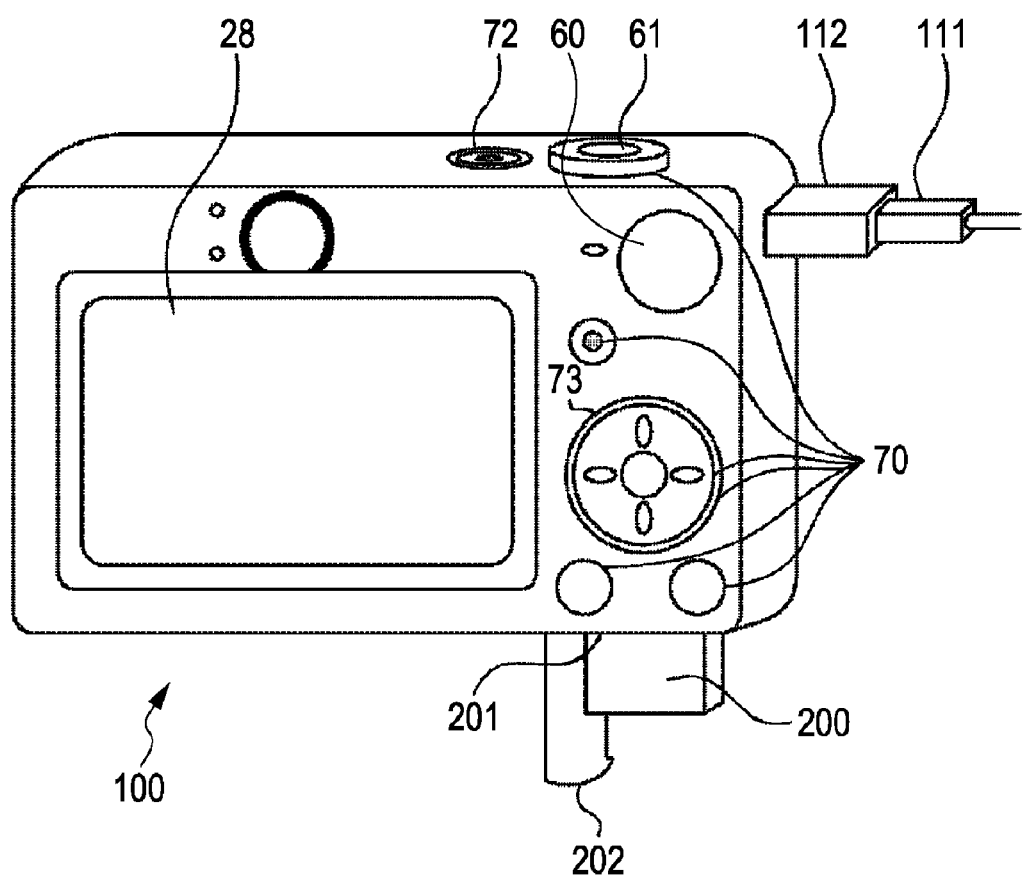
FIG. 1A is an external appearance view of a digital camera as an example of an image display control apparatus according to an exemplary embodiment of the present invention.

FIG. 1A is an external appearance view of a digital camera as an example of an image display control apparatus according to an exemplary embodiment of the present invention. In FIG. 1A, a display unit 28 displays an image and various items of information. A power switch 72 switches over power-on and power-off. Numeral 61 denotes a shutter button. A zoom lever is disposed outside the shutter button 61. A mode selector switch 60 changes over various modes in a digital camera 100. More specifically, the mode selector switch 60 can change over modes such as a still recording mode, a movie recording mode, and a reproducing mode. A connection cable 111 connects the digital camera 100 to external equipment. A connector 112 connects the connection cable 111 and the digital camera 100 to each other.

Operating units 70 receive various input operations from a user. The operating units 70 are constituted by various operating members in the form of, e.g., illustrated buttons and a touch panel disposed on a screen of the image display unit 28. Various buttons of the operating units 70 includes, e.g., an erase button, a menu button, a SET button, four-direction buttons (i.e., an upward button, a downward button, a rightward button, and a leftward button) arranged in the crossed form, and a wheel 73. Numeral 200 denotes a recording medium such as a memory card or a hard disk. A recording medium slot 201 accommodates the recording medium 200. The recording medium 200 accommodated in the recording medium slot 201 can communicate with the digital camera 100. Numeral 202 denotes a cover of the recording medium slot 201.

(b) Block Diagram

FIG. 1B is a block diagram illustrating an example of the construction of the digital camera 100 according to the exemplary embodiment. In FIG. 1B, the digital camera 100 includes an imaging lens 103, a shutter 101 with an aperture function, and an image pickup unit 22 constituted by, e.g., a CCD sensor or a CMOS device for converting an optical image to an electric signal. An A/D converter 23 converts an analog signal to a digital signal. The A/D converter 23 is used when an analog signal output from the image pickup unit 22 is converted to a digital signal, and when an analog signal output from an audio control unit 11 is converted to a digital signal. A barrier 102 covers an image capturing section of the digital camera 100, including the imaging lens 103, to thereby prevent contamination and damage of an image pickup system including the imaging lens 103, the shutter 101, and the image pickup unit 22.

A timing generator 12 supplies a clock signal and control signals to each of the image pickup unit 22, the audio control unit 11, the A/D converter 23, and a D/A converter 13. The timing generator 12 is controlled by a memory control unit 15 and a system control unit 50. An image processing unit 24 executes a predetermined resizing process, such as pixel interpolation and reduction, and a predetermined color conversion process on data from the A/D converter 23 and data from the memory control unit 15. Also, the image processing unit 24 executes predetermined calculations (computations) based on captured image data, and the system control unit 50 executes exposure control and focus adjustment based on the calculation results. A TTL (through-the-lens) AF (autofocusing) process, an AE (automatic exposure) process, an FE (flash pre-emission) process are thereby executed. Further, the image processing unit 24 executes a predetermined calculation process based on the captured image data and performs a TTL AWB (auto-white balance adjustment) process based on the calculation result.

Output data from the A/D converter 23 is written in a memory 32 through the image processing unit 24 and the memory control unit 15 or only through the memory control unit 15. The memory 32 stores not only image data that has been obtained by the image pickup unit 22 and converted to digital data by the A/D converter 23, but also image data displayed on the image display unit 28. The memory 32 is also used to store audio data recorded through a microphone 10, still images, moving images, and a file header when an image file is formed. Accordingly, the memory 32 has a storage capacity sufficient to store a predetermined number of still images, a predetermined time of moving images, and voices.

A compression/expansion unit 16 compresses and expands image data with, e.g., adapted discrete cosine transform (ADCT). The compression/expansion unit 16 reads a captured image, which has been stored in the memory 32, in response to a trigger provided from the shutter 101, compresses the read image, and writes compressed data in the memory 32. Also, the compression/expansion unit 16 expands a compressed data, which has been read into the memory 32 from, e.g., a recording unit 19 in a recording medium 200, and writes the expanded data in the memory 32. The image data having been written in the memory 32 by the compression/expansion unit 16 is formatted into a file by a file unit in the system control unit 50 and is recorded in the recording medium 200 through an interface 18. The memory 32 also serves as an image display memory (i.e., a video memory). The D/A converter 13 converts image display data stored in the memory 32 to an analog signal and then supplies the analog signal to the image display unit 28. The image display unit 28 presents a view corresponding to the analog signal from the A/D converter 23 on a display, e.g., an LCD. Thus, the image display data written in the memory 32 is displayed on the image display unit 28 through the D/A converter 13.

Numeral 10 denotes a microphone. An audio signal output from the microphone 10 is supplied to the A/D converter 23 through the audio control unit 11 constituted by an amplifier, etc. and is converted to a digital signal by the A/D converter 23. The converted digital signal is stored in the memory 32 by the memory control unit 15. On the other hand, audio data recorded on the recording medium 200 is read into the memory 32 and then converted to an analog signal by the D/A converter 13. The audio control unit 11 drives a speaker 39 in accordance with the analog signal and outputs voices.

A non-volatile memory 56 is an electrically erasable and recordable memory, e.g., an EEPROM. The non-volatile memory 56 stores the constants, programs, etc. which are used in operations of the system control unit 50. The programs are ones for executing various flowcharts (described later) used in this exemplary embodiment.

The system control unit 50 controls the entirety of the digital camera 100. The system control unit 50 executes the programs recorded in the non-volatile memory 56, thereby realizing later-described various processes in this exemplary embodiment. Also, the system control unit 50 controls the memory 32, the memory control unit 15, etc., thereby executing display control of the image display unit 28. Numeral 52 denotes a system memory made of a RAM. The system memory 52 serves to develop the constants, variables, programs read out from the non-volatile memory 56, etc., which are used for the operation of the system control unit 50.

The mode selector switch 60, a first shutter switch 62, and a second shutter switch 64, and the operating units 70 serve as operating members for inputting various operation instructions to the system control unit 50.

The mode selector switch 60 can change the operating mode of the system control unit 50 to one of the still recording mode, the movie recording mode, and the reproducing mode. The first shutter switch 62 is turned on halfway the operation (i.e., with half-press) of the shutter button 61 disposed on the digital camera 100 and generates a first shutter switch signal SW1. In response to the first shutter switch signal SW1, the system control unit 50 starts operations such as the AF (auto-focusing) process, the AE (automatic exposure) process, the AWB (auto-white balance adjustment) process, and the FE (flash pre-emission) process.

The second shutter switch 64 is turned on with completion of the operation (full-press) of the shutter button 61 and generates a second shutter switch signal SW2. In response to the second shutter switch signal SW2, the system control unit 50 starts a series of operations for a shooting process from read of signals from the image pickup unit 22 to write of image data into the recording medium 200.

The operating members constituting the operating units 70 are each assigned with an appropriate function per situation and serve as various function buttons, for example, by selecting one of various function icons displayed on the image display unit 28. The function buttons include, e.g., an end button, a return button, an image advance button, a jump button, a narrowing button, and an attribute change button. For example, when a menu button is pressed, a menu screen allowing a user to make various settings is displayed on the image display unit 28. The user can intuitively make various settings by using the menu screen displayed on the image display unit 28, the four-direction button, and the SET button. The power switch 72 changes over power-on and power-off.

A power control unit 80 is constituted by a battery detection circuit, a DC-DC converter, a switch circuit for changing over a block to which power is supplied, and it detects loading/unloading of a battery, the type of the battery, and the remaining capacity of the battery. Also, the power control unit 80 controls the DC-DC converter in accordance with the detection result and an instruction from the system control unit 50, and supplies required voltages to various units, including the recording medium 200, during required periods.

A power unit 30 is constituted by a primary battery such as an alkaline cell or a lithium cell, a secondary battery such as a NiCd cell, a NiMH cell or a Li cell, and/or an AC adaptor. Connectors 33 and 34 connect the power unit 30 and the power control unit 80 to each other.

An RTC (Real Time Clock) 40 counts the date and time. The RTC 40 includes a power unit therein separate from the power control unit 80 and can continue time-count even when the power unit 30 is turned off. The system control unit 50 sets a system timer by using the date and time that have been obtained from the RTC 40 at the startup, and then executes timer control.

Numeral 18 denotes an interface with respect to the recording medium 200, such as a memory card or a hard disk. A connector 35 connects the recording medium 200 and the interface 18 to each other. A recording medium loading/unloading detection unit 96 detects whether the recording medium 200 is loaded into the connector 35.

The recording medium 200 is in the form of a memory card or a hard disk. The recording medium 200 includes a recording unit 19 constituted by a semiconductor memory or a magnetic disk, an interface 37 with respect to the digital camera 100, and a connector 36 for connecting the recording medium 200 and the digital camera 100.

A communication unit 110 executes various communication processes adapted for, e.g., RS232C, USB, IEEE1394, P1284, SCSI, a modem, LAN, and wireless communication. A connector 112 (or an antenna in the case of wireless communication) connects the digital camera 100 to other equipment through the communication unit 110.

(Overall Operation of Digital Camera 100)

Figure 2:
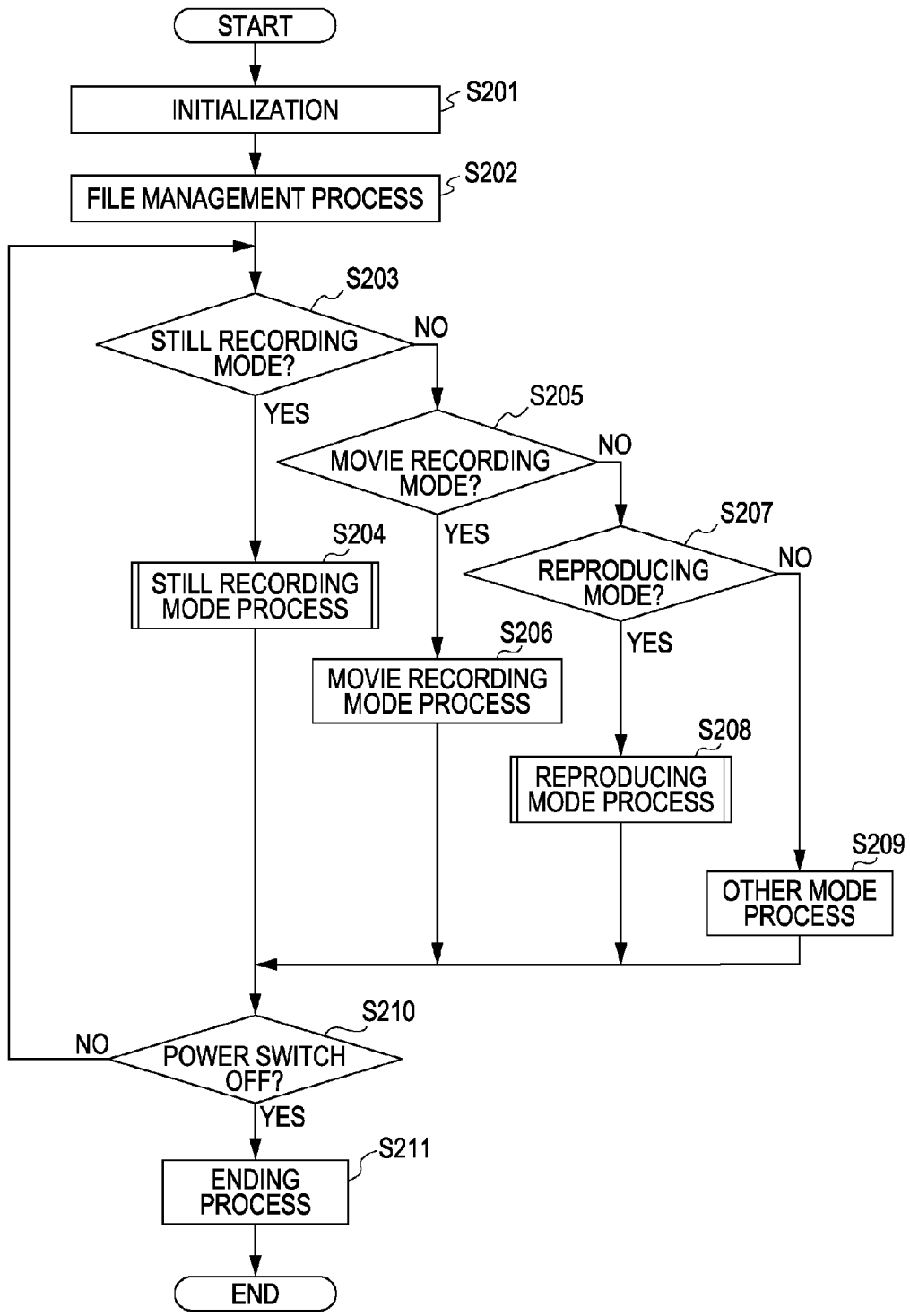
FIG. 2 is a flowchart illustrating transition of camera modes in the exemplary embodiment of the present invention.

FIG. 2 is a flowchart illustrating the overall operation of the digital camera 100 according to the exemplary embodiment.

When the power switch 72 is operated to turn on the power, the system control unit 50 initializes flags, control variables, etc. in step S201. Then, the system control unit 50 starts, in step S202, a management process regarding files recorded in the recording medium 200.

Next, in steps S203, S205 and S207, the system control unit 50 determines the setting position of the mode selector switch 60. If the mode selector switch 60 is set to the still recording mode, the processing advances from step S203 to step S204 where a still recording mode process is executed. Details of the still recording mode process in step S204 will be described later with reference to FIG. 3. If the mode selector switch 60 is set to the movie recording mode, the processing advances, through steps S203 and S205, to step S206 where a movie recording mode process is executed. If the mode selector switch 60 is set to the reproducing mode, the processing advances, through steps S203, S205 and S207, to step S208 where a reproducing mode process is executed. Details of the reproducing mode process in step S208 will be described later with reference to FIG. 6.

If the mode selector switch 60 is set to one of other modes, the processing advances to step S209 where the system control unit 50 executes a process corresponding to the selected mode. The other modes include, e.g., a transmission mode process for transmitting a file stored in the recording medium 200, and a reception mode process for receiving a file from external equipment and stores it in the recording medium 200.

After executing the process in one of the steps S204, S206, S208 and S209 corresponding to the mode set by the mode selector switch 60, the processing advances to step S210. In step S210, the system control unit 50 determines the setting position of the power switch 72. If the power switch 72 is set to power-on, the processing is returned to step S203. On the other hand, if the power switch 72 is set to power-off, the processing advances from step S210 to step S211 where the system control unit 50 executes an ending process. The ending process includes, e.g., changing the display presented on the image display unit 28 to an end state, closing the lens barrier 102 to protect the image pickup unit, recording parameters including flags, control variables, etc., the setting values, and the setting mode in the non-volatile memory 56, and cutting off power supplied to those units that do not require the supply of power any more. Upon completion of the ending process in step S311, the processing is brought to an end and the power is shifted to an off-state.

(Still Recording Mode)

Figure 3:
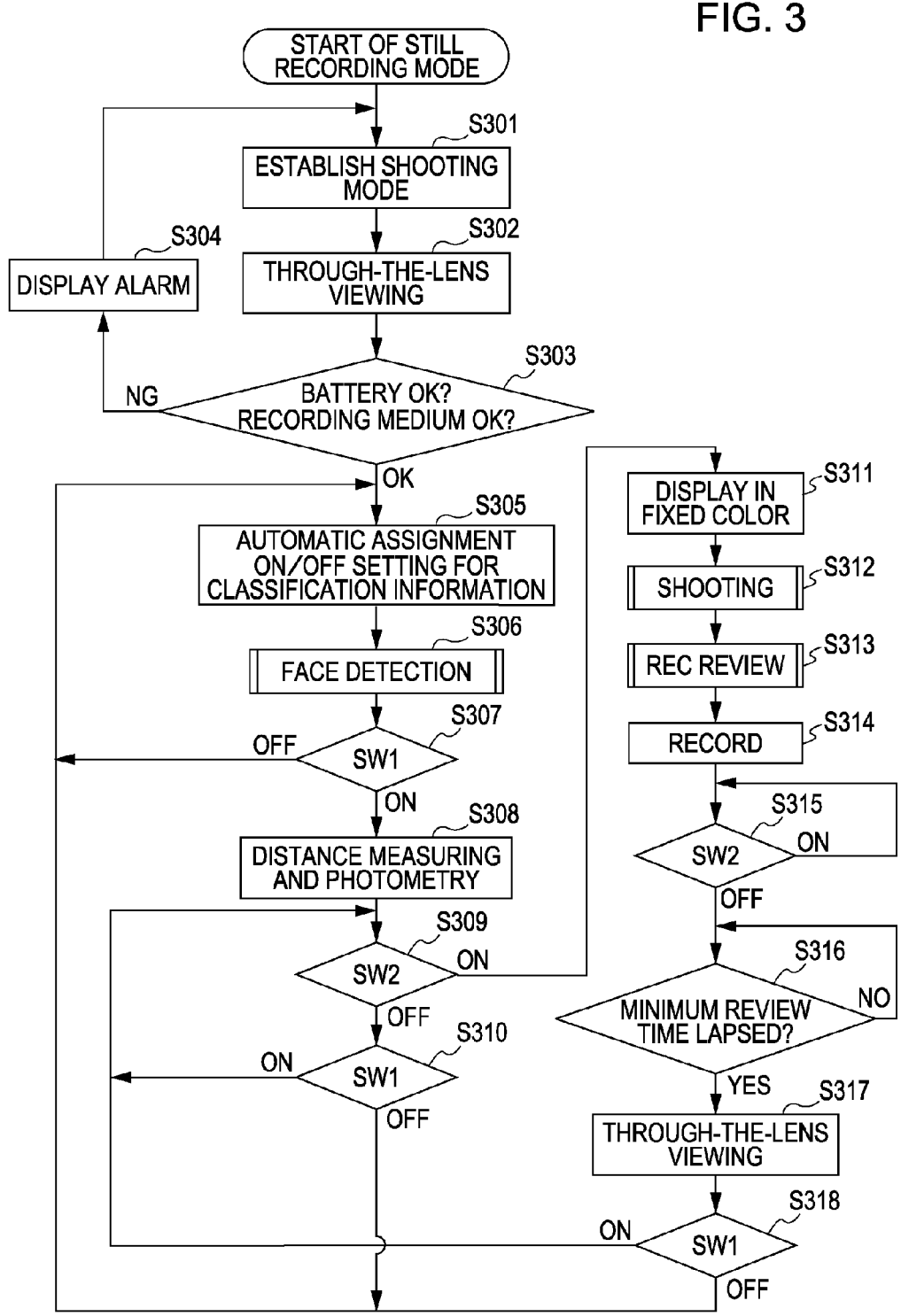
FIG. 3 is a flowchart illustrating a shooting mode in the exemplary embodiment of the present invention.

FIG. 3 is a flowchart illustrating the still recording mode process in step S204 of FIG. 2. The still recording mode process of FIG. 3 is brought to an end by an interrupt process, for example, when the operating mode is changed to another mode by the mode selector switch 60, or when the power switch 72 is set to be off.

After starting the still recording mode process, the system control unit 50 establishes a shooting mode in step S301. The shooting mode is established by;

(1) acquiring the shooting mode at the end of the preceding still recording mode from the non-volatile memory 56 and storing it in the system memory 52, or (2) when setting of the shooting mode is input by the user operating the operating unit 70, by storing the input setting of the shooting mode in the system memory 52. The term "shooting mode" used herein means a mode that is realized in combination of a shutter speed, an aperture value, a strobe emission state, sensitivity setting, etc. which are suitable for a scene to be shot.

In the digital camera 100 of this exemplary embodiment, the shooting mode is classified as follows:

Auto-mode: various parameters of the camera are automatically determined based on the measured exposure value by the program incorporated in the digital camera 100.

Manual mode: various parameters of the camera can be freely changed by the user.

Scene mode: a combination of the shutter speed, the aperture value, the strobe emission state, the sensitivity setting, etc., which are suitable for a scene to be shot, is automatically set.

The scene mode is further classified as follows:

Portrait mode: this mode is particularly fit for shooting a portrait by making the background blur and the portrait more prominent.

Night scene mode: this mode is particularly fit for shooting a night scene by illuminating a strobe light to a human object and recording the background at a lower shutter speed.

Landscape mode: this mode is particularly fit for shooting a wide landscape scene.

Night & snap mode: this mode is particularly fit for clearly shooting a night scene and a human object without using a tripod.

Kids & pet mode: this mode enables a quickly moving child or pet to be shot without missing a shutter chance.

Fresh green and autumn tint mode: this mode is particularly fit for vividly shooting trees and leaves in the fresh green season, etc.

Party mode: this mode is particularly fit for shooting an object under illumination of a fluorescent lamp or an incandescent light bulb in tints with higher fidelity to the object while suppressing a shake.

Snow mode: this mode enables a human object to be shot without darkening a human face, etc. and without leaving a blue tint in the background of a snow scene.

Beach mode: this mode enables a human object to be shot without darkening a human face, etc. even on the surface of the sea or in the beach where the strong sunlight is reflected.

Firework mode: this mode is particularly fit for vividly shooting fireworks with an optimum exposure.

Aquarium mode: this mode sets sensitivity, white balance, and tints to be fit for shooting, e.g., fish in indoor water tanks.

Underwater mode: this mode sets white balance to be optimum for underwater shooting in colors suppressing a blue tint.

If the shooting mode is established in step S301, the system control unit 50 performs a through-the-lens viewing to display the image data from the image pickup unit 22 in step S302. Then, the system control unit 50 determines, in step S303, not only the remaining capacity of the battery by using the power control unit 80, but also the presence of the recording medium 200 and whether the remaining capacity thereof is sufficient for the operation of the digital camera 100. If there is any problem, a predetermined alarm is displayed in step S304 in the form of an image or voices by the image display unit 28, and the processing is returned to step S301.

If there is no problem with the state of the recording medium 200, the system control unit 50 executes, as required, automatic assignment on/off setting for classification information in step S305. The automatic assignment on/off setting can be freely made by the user on the menu screen (not shown) that is displayed on the image display unit 28 upon pressing of the menu button as one of the operating units 70. More specifically, the automatic assignment on/off setting for classification information is made using a flag indicating whether the classification information is automatically assigned depending on the scene mode and object conditions. A setting value (on/off value of the flag) is held in the system memory 52. Thus, the automatic assignment on/off setting for classification information can avoid assignment of the classification information that is not intended by the user. Details of the classification information will be described later.

Then, in step S306, the system control unit 50 executes a face detection process for detecting whether a human face is present in image signals displayed in the through-the-lens viewing. The face detection process will be described later with reference to FIG. 4. If a human face is detected in the face detection process, the system control unit 50 stores, as face information, the number of faces detected in the image signals, the position coordinates and the size (width and height) of each face, the reliability coefficient thereof, etc. in the system memory 52. If any human face is not detected in the face detection process, the system control unit 50 sets 0 in each of areas in the system memory 52, which represent the number of faces detected, the position coordinates and the size (width and height) of each face, the reliability coefficient thereof, etc.

Then, in step S307, the system control unit 50 determines whether the first shutter switch signal SW1 is turned on. If the first shutter switch signal SW1 is turned off, the processing is returned to step S305 to repeat the above-described steps S305 and S306. On the other hand, if the first shutter switch signal SW1 is turned on, the processing advances to step S308. In step S308, the system control unit 50 executes a distance measuring process for focus adjustment to make the imaging lens 103 in focus with the object, and also executes a photometric process for exposure control to determine the aperture value, the shutter time (shutter speed), etc. In the photometric process, setting of a flash (light control) is also executed as required. Additionally, if face priority AF requiring distance measurement in the range of the detected face is set in advance, focus adjustment is executed in the range of the detected face if the face is detected in step S306.

Then, in steps S309 and S310, on/off states of the first shutter switch signal SW1 and the second shutter switch signal SW2 are determined. If the second shutter switch signal SW2 is turned on in the on-state of the first shutter switch signal SW1, the processing advances from step S309 to step S311. If the first shutter switch signal SW1 is turned off (i.e., if the first shutter switch signal SW1 is canceled with the second shutter switch signal SW2 not turned on), the processing is returned from step S310 to step S305. During a period in which the first shutter switch signal SW1 is turned on and the second shutter switch signal SW2 is turned off, the processing of steps S309 and S310 is repeated.

If the second shutter switch SW2 is pressed, the system control unit 50 sets, in step S311, the display state of the image display unit 28 from the through-the-lens viewing to a fixed-color display state. Then, in step S312, the system control unit 50 executes the shooting process including an exposure process and a development process. In the exposure process, the image data obtained from the A/D converter 23 is written in the memory 32 through the image processing unit 24 or directly from the A/D converter 23. In the development process, the system control unit 50 reads the image data written in the memory 32, as required, and executes various processes. Details of the shooting process will be described in detail with reference to FIG. 5.

Then, in step S313, the system control unit 50 performs, on the image display unit 28, a REC review of the image data obtained with the shooting process. The term "REC review" means a process of, for confirming the captured image, displaying the image data on the image display unit 28 for a predetermined time (review time) before the image data is recorded on the recording medium after the shooting of the object. Details of the REC review process will be described later with reference to FIG. 7. After the REC review, the system control unit 50 executes, in step S314, a recording process of writing the image data obtained in the shooting process, as an image file, in the recording medium 200.

After the end of the recording process in step S314, the system control unit 50 determines, in step S315, the on/off state of the second shutter switch signal SW2. If the second shutter switch signal SW2 is turned on, it repeats the determination of step S315 and waits for the second shutter switch signal SW2 being turned off. During a waiting period, the REC review is continued. In other words, when the recording process in step S314 is completed, the REC review on the image display unit 28 is continued until the second shutter switch signal SW2 is turned off. With such an arrangement, the user can closely confirm the captured image data with the REC review by continuously holding the fully-pressed state of the shutter button 61.

If the shutter button 61 is released from the fully pressed state upon detaching of the user's hand after the user has fully pressed the shutter button 61 to make shooting, the processing advances from step S315 to step S316. In step S316, the system control unit 50 determines whether the predetermined review time has lapsed. If the predetermined review time has lapsed, the processing advances to step S317. In step S317, the system control unit 50 returns the display state on the image display unit 28 from the REC review to the through-the-lens viewing. Thus, after confirming the captured image data with the REC review, the display state of the image display unit 28 is automatically changed to the through-the-lens viewing in which image data from the image pickup unit 22 is successively displayed to be ready for next shooting.

In step S318, the system control unit 50 determines the on/off state of the first shutter switch signal SW1. If the first shutter switch signal SW1 is turned on, the processing is returned to step S309, and if it is turned off, the processing is returned to step S305. Stated another way, if the half-pressed state of the shutter button 61 is continued (i.e., if the first shutter switch signal SW1 is held on), the system control unit 50 remains ready for next shooting (step S309). On the other hand, if the shutter button 61 is released (i.e., the first shutter switch signal SW1 is turned off), the system control unit 50 brings the series of shooting operations to an end and returns to the shooting standby state (step S305).

(Face Detection)

Figure 4:
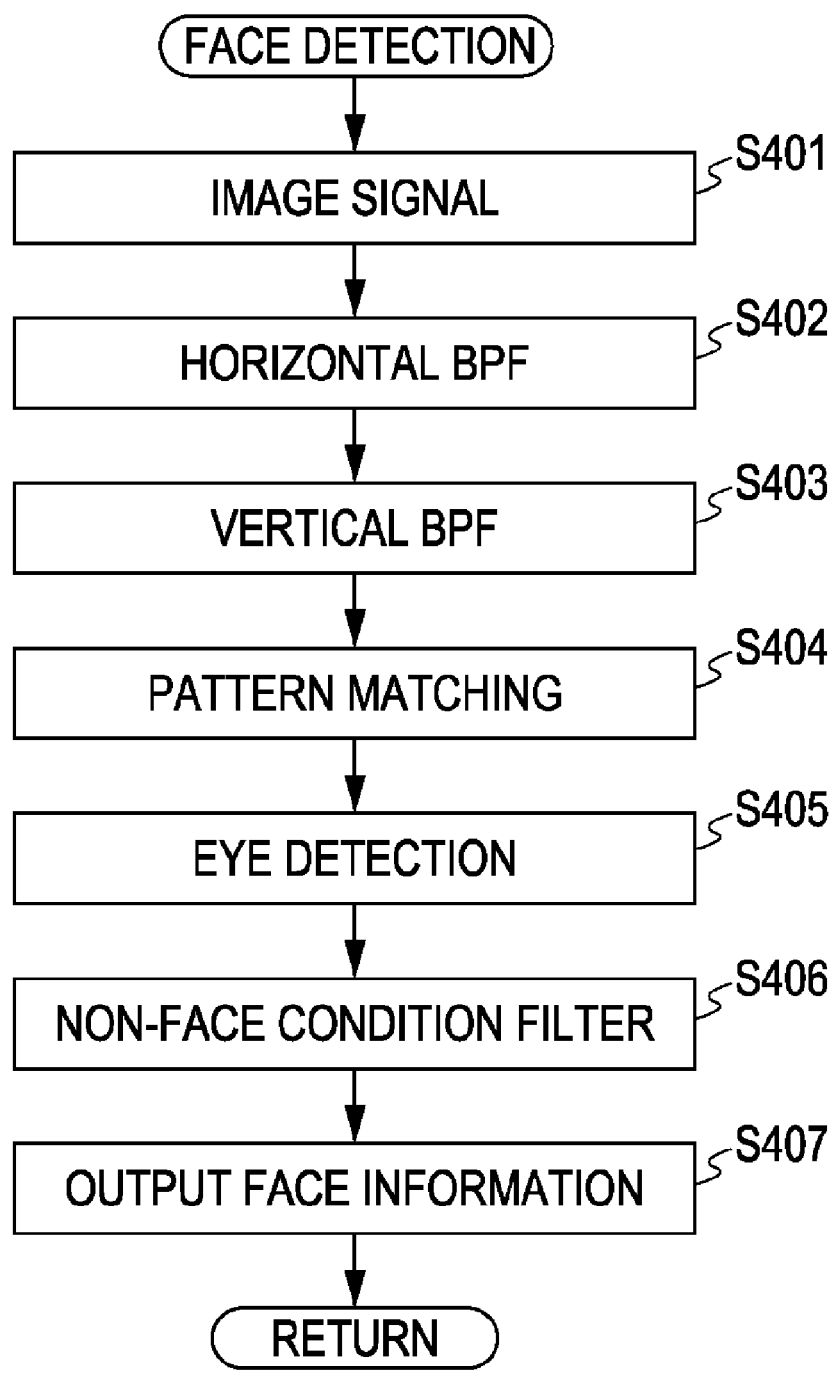
FIG. 4 is a flowchart illustrating face detection in the exemplary embodiment of the present invention.

One example of the face detection process in step S306 of FIG. 3 will be described below with reference to FIG. 4. In step S401, the system control unit 50 sends image data for the face detection to the image processing unit 24. In step S402, the image processing unit 24 causes the relevant image data to pass through a horizontal band-pass filter (BDF) under control of the system control unit 50. Further, in step S403, the image processing unit 24 causes the relevant image data having been processed in step S402 to pass through a vertical band-pass filter (BDF) under control of the system control unit 50. Edge components are detected from the image data with the horizontal and vertical band-pass filters.

Then, in step S404, the system control unit 50 executes pattern matching with respect to the detected edge components, thereby extracting groups of candidates for eyes, a nose, a mouth and ears. In step S405, the system control unit 50 determines, from among the eye candidates extracted in step S404, those ones satisfying preset conditions (e.g., a distance between two eyes and an inclination thereof) as a pair of eyes, and narrows the eye candidates to an eye candidate group each including the pair of eyes. Then, in step S406, the system control unit 50 correlates the eye candidate group selected in step S405 with other parts (nose, mouth and ears) that form a face corresponding to each candidate, and then causes resulting data to pass through a preset non-face condition filter, thereby detecting a face. In step S407, the system control unit 50 outputs the face information depending on the face detection result in step S406 and brings the processing to an end. At that time, the feature information, such as the number of faces detected and the size of an area of each detected face, is stored in the system memory 52.

As described above, object information of a particular object can be detected by analyzing the image data displayed in the through-the-lens viewing and extracting the feature information of the image data. While in this exemplary embodiment the face information is obtained as an example of the object information of the particular object, the object information of the particular object can include other various kinds of information such as based on red-eye determination.

(Shooting)

Figure 5:
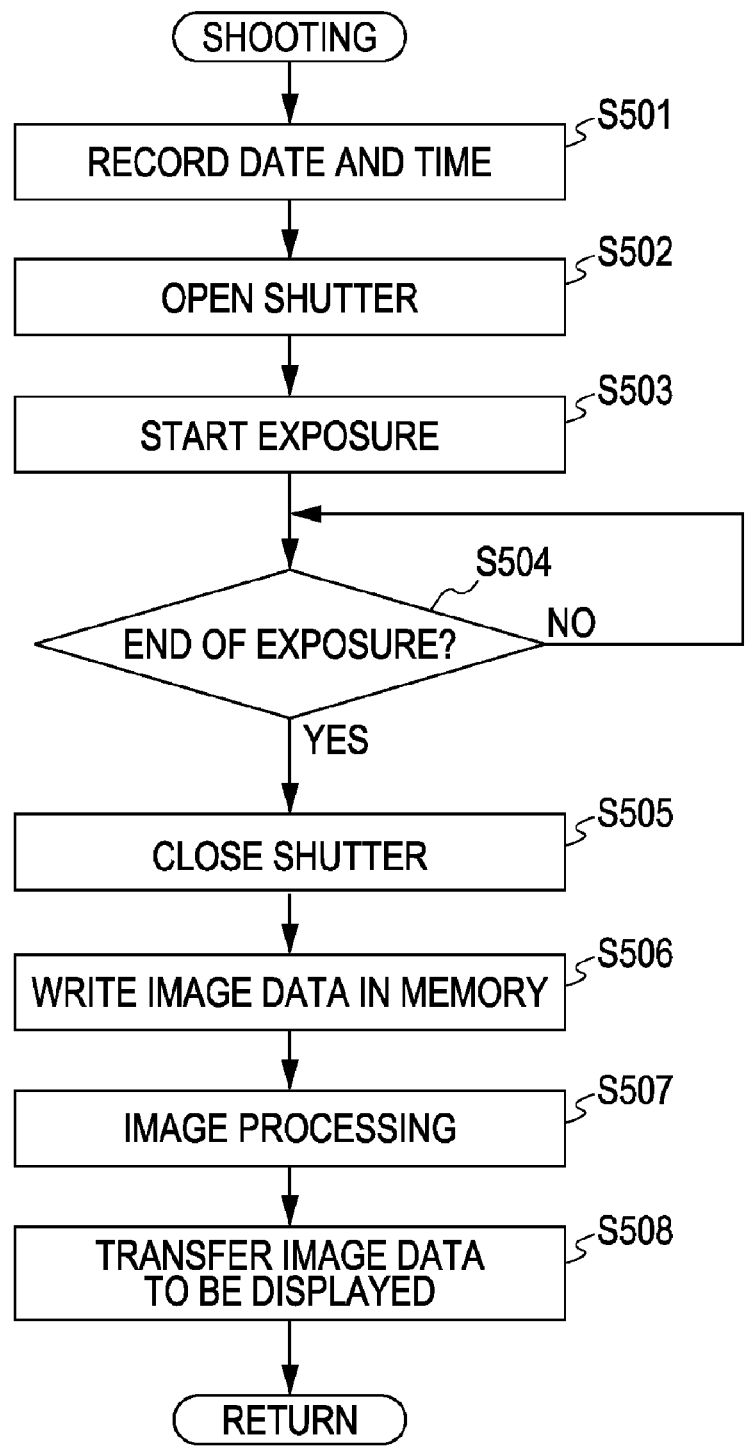
FIG. 5 is a flowchart illustrating a shooting process in the exemplary embodiment of the present invention.

FIG. 5 is a flowchart illustrating the shooting process in step S312 of FIG. 3.

In step S501, the system control unit 50 obtains the date and time from the system timer at the start of the shooting and stores them in the system memory 52. In step S502, the system control unit 50 opens the shutter 101, which has the aperture function, corresponding to the aperture value in accordance with the exposure control data stored in the system memory 52. Exposure is thus started (step S503).

In step S504, the system control unit 50 waits for the end of the exposure by the image pickup unit 22 in accordance with the exposure control data. Upon reaching the end time of the exposure, the system control unit 50 closes the shutter 101 in step S505. In step S506, the system control unit 50 reads charge signals from the image pickup unit 22 and writes image data obtained from the A/D converter 23 in the memory 32 through the image processing unit 24 or directly from the A/D converter 23. The above-described steps S501-S506 correspond to the exposure process.

Then, in step S507, the system control unit 50 reads the image data written in the memory 32 and executes various steps of image processing successively as required. The image processing includes, e.g., a white balance process and a compression process using the compression/expansion unit 16. The processed image data is written in the memory 32. In step S508, the system control unit 50 reads the image data from the memory 32 and expands the image data by the compression/expansion unit 16 for resizing to be adapted for display on the image display unit 28. The resized image data is transferred to the D/A converter 13 to be displayed on the image display unit 28. The shooting process is completed with the end of the series of processing steps described above.

(Operation in Reproducing Mode)

Figure 6:
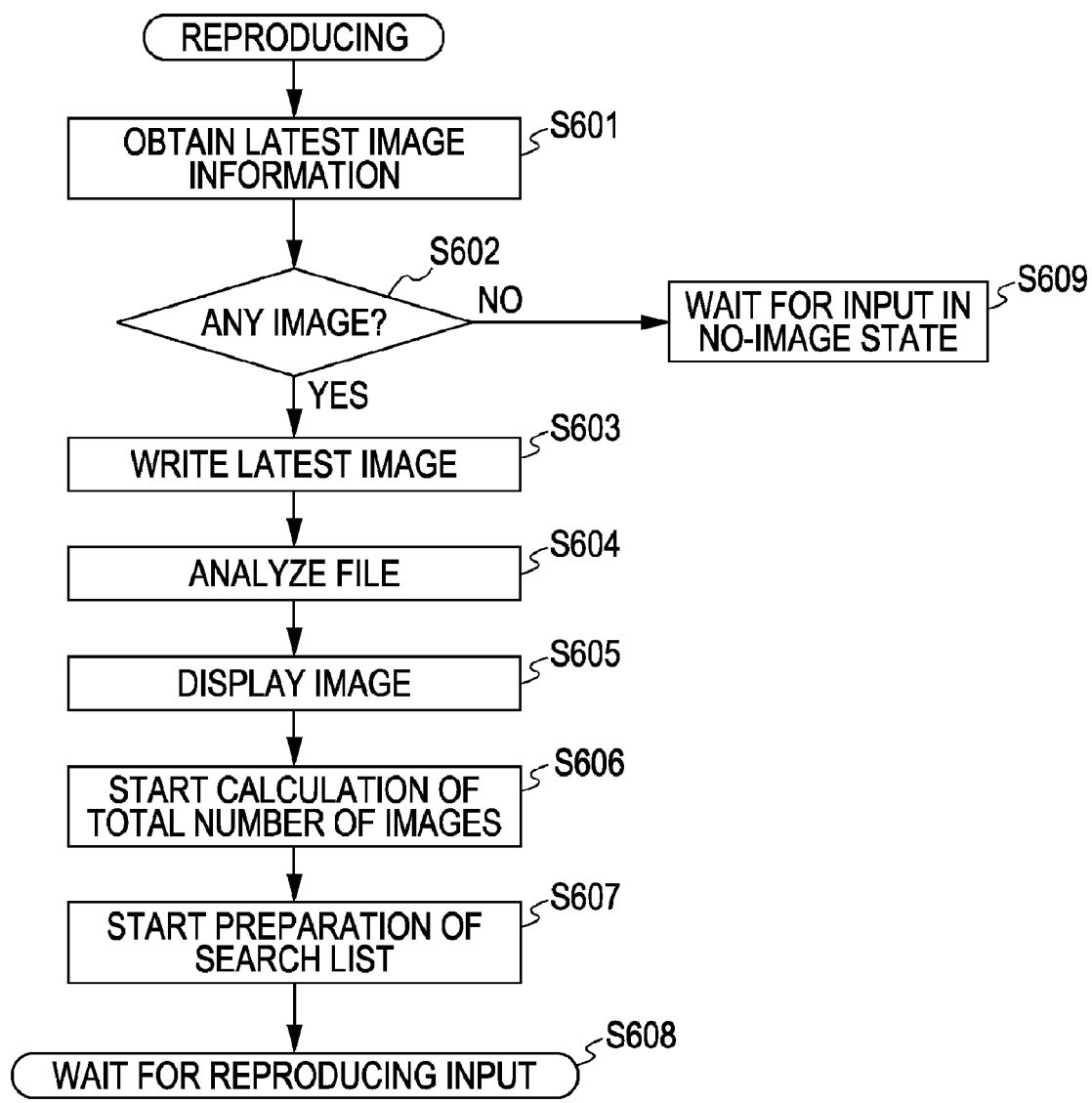
FIG. 6 is a flowchart illustrating a reproducing process in the exemplary embodiment of the present invention.

FIG. 6 is a flowchart illustrating the operation of the reproducing mode in the digital camera 100 according to this exemplary embodiment. The flowchart of FIG. 6 illustrates step S208 of FIG. 2 in detail.

In step S601, the system control unit 50 obtains the latest image information from the recording medium 200. Obtaining the latest image information prior to calculating the total number of images and preparing a search list is advantageous in displaying the processed image as soon as possible in the reproducing mode. In step S602, the system control unit 50 checks whether the latest image information is correctly obtained in step S601. If the latest image information is not correctly obtained, the processing advances to step S609 where the system control unit 50 waits for an input in a no-image state. The case where the latest image information is not obtained occurs, for example, when there is no image, or when no image information is obtained due to a media failure. If the latest image information is obtained, this is determined as indicating the presence of at least one image, and the processing advances to step S603.

In step S603, the system control unit 50 reads the latest image data from the recording medium 200 based on the latest image information that has been obtained in step S601. In step S604, the system control unit 50 executes a file analysis process and obtains photographing information, attribute information, etc. of the image from the read latest image information. In step S605, the system control unit 50 displays the read latest image information. At that time, the system control unit 50 displays the photographing information, attribute information, etc. as well, which have been obtained in step S604. Further, if it is determined from the file analysis result in step S604 that the obtained data is incorrect, for example, if part of the file is broken, an error indication is also performed.

In step S606, the system control unit 50 starts a process of obtaining the total number of images recorded on the recording medium 200. The processing of step S606 is executed in a background mode such that the processing can advance to next step without waiting for the end of step S606. Accordingly, even when a large volume of image data is stored in the recording medium 200 and it takes a time to calculate the total number of images, an image review can be started without waiting for the end of the calculation of the total number of images. The above-described process is particularly effective in the case that, when the operating mode is shifted from the recording mode to the reproducing mode, image data is additionally recorded or deleted in the recording mode and the total number of images is changed. If image data has not been additionally recorded or deleted in the recording mode, the process of calculating the total number of images is not required because the already calculated total number of images can be utilized.

Then, in step S607, the system control unit 50 starts a process of preparing a search list. The search list is a list prepared by obtaining the attribute information associated with the image data in advance for management. Forming the search list in advance enables a certain process, such as reproducing or erasing, to be quickly executed per attribute. The search list preparation process is also executed in a background mode similarly to the total image number calculation process such that next step can be executed without waiting for the end of step S607. In step S608, the system control unit 50 comes into an input waiting state. Processing in the input waiting state will be described later with reference to a flowchart of FIG. 10.

(REC Review)

Figure 7:
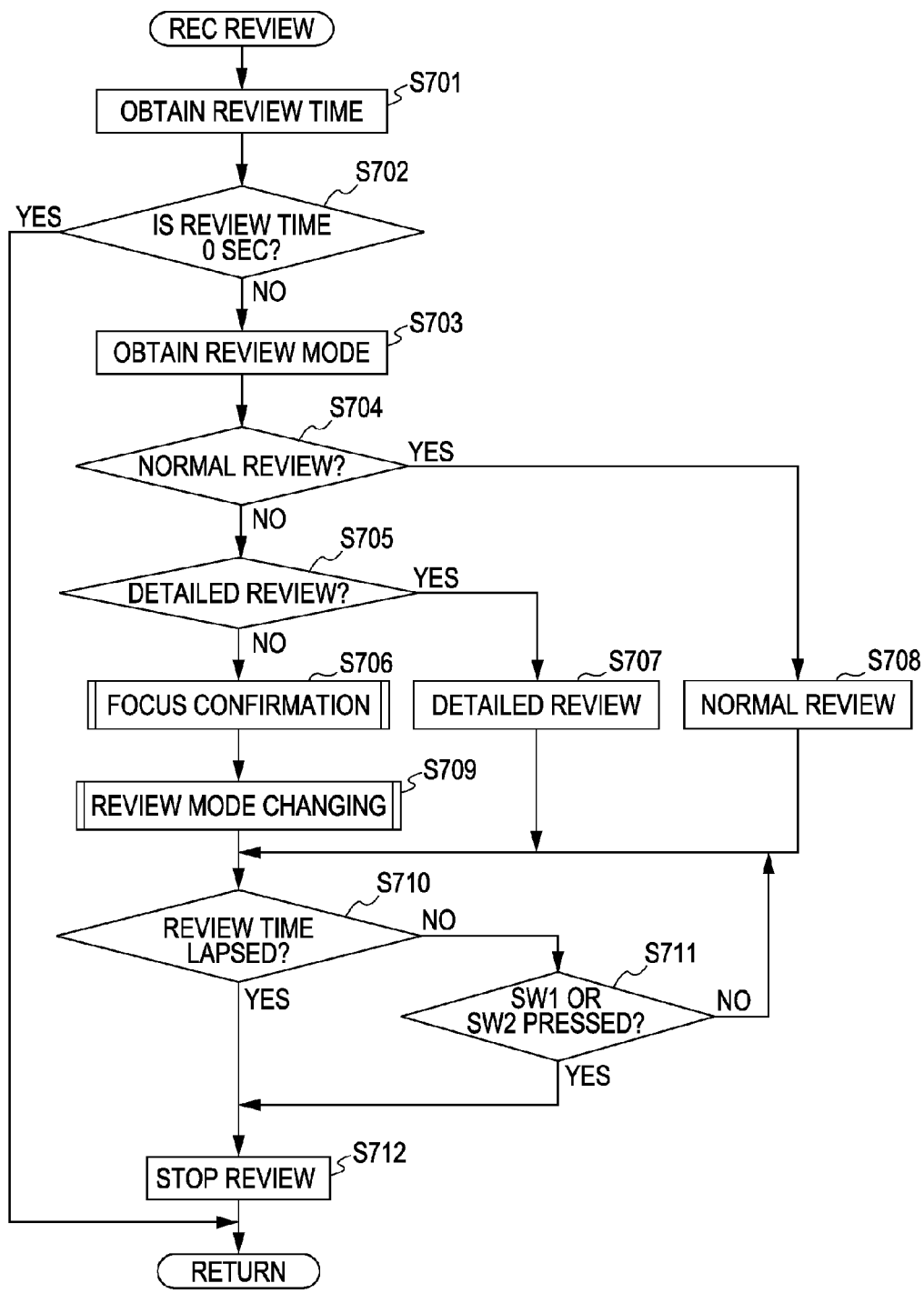
FIG. 7 is a flowchart illustrating a REC review process in the exemplary embodiment of the present invention.

FIG. 7 is a flowchart illustrating a REC review process in step S313 of FIG. 3.

In step S701, the system control unit 50 obtains the review time that is temporarily stored in the system memory 52. If the review time is 0 sec, the REC review process is brought to an end (step S702).

In step S703, the system control unit 50 obtains the review mode that is temporarily stored in the system memory 52. If the review mode is "normal review" (step S704), the system control unit 50 displays only the captured image, which is stored in the memory 32, on the image display unit 28 through the memory control unit 15 (step S708).

If the review mode is "detailed review" (step S705), the system control unit 50 displays the captured image and the photographing information associated with each captured image, which are stored in the memory 32, on the image display unit 28 through the memory control unit 15 (step S707).

If the review mode is neither the normal review nor the detailed review, focus confirmation information is displayed on the image display unit 28 (step S706). The focus confirmation process will be described later with reference to FIG. 9.

In step S709, the system control unit 50 can change over, during the review, a state of displaying an entire display region in a larger size where an entire captured image is displayed, and an enlarged display region in a larger size where part of the captured image is displayed. The review mode changing process will be described later with reference to FIG. 8.

In step S710, the system control unit 50 monitors the review time and stops the review if the review time has lapsed (step S712). Even in the case of the review time being not lapsed, if SW1 or SW2 is pressed (YES in step S711), the review is brought to an end and the preparation for next shooting is started.

(Review Mode Changing)

Figure 8:
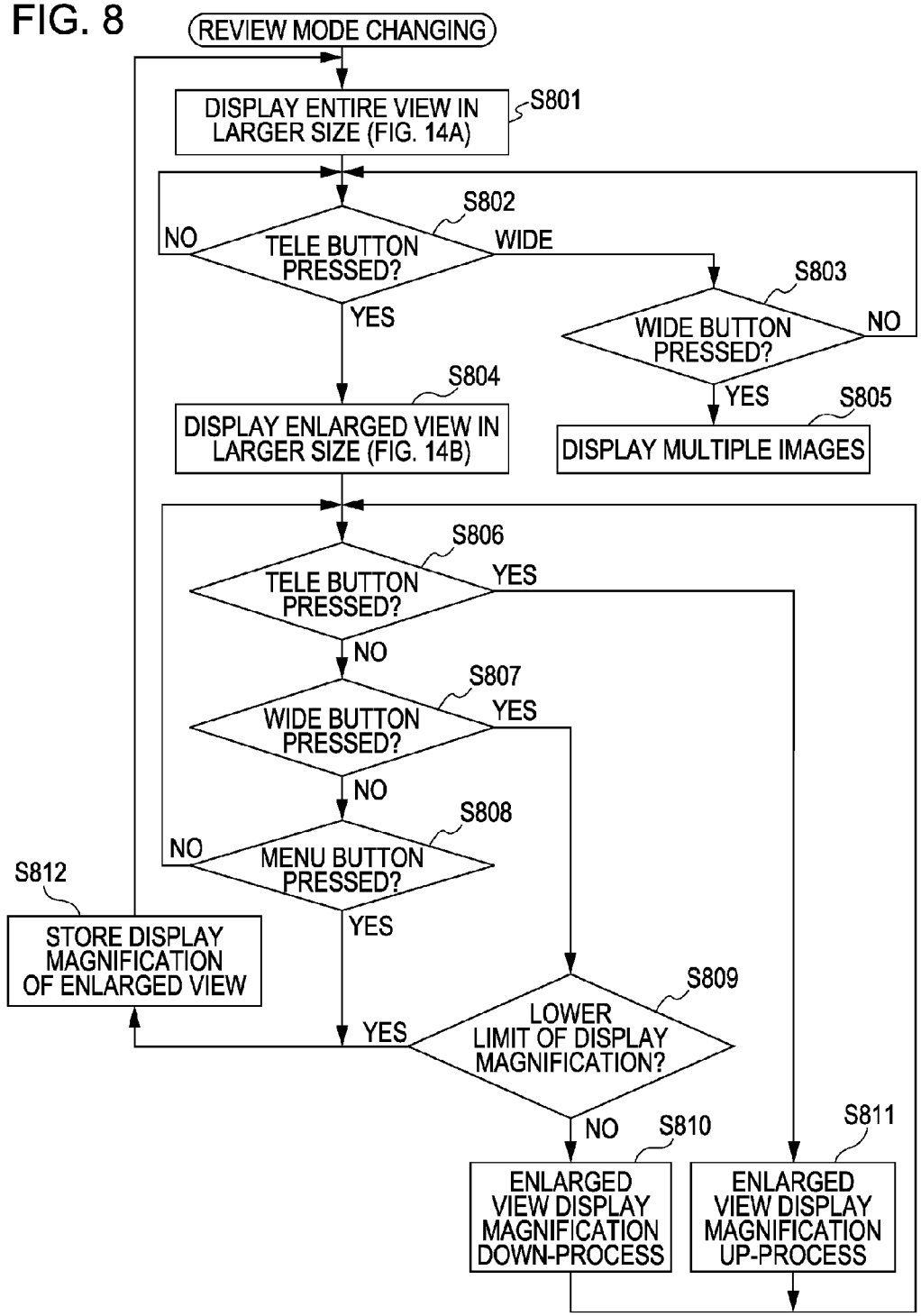
FIG. 8 is a flowchart illustrating a review mode changing process in the exemplary embodiment of the present invention.

FIG. 8 is a flowchart illustrating a review mode changing process in step S709 of FIG. 7.

Figure 14A:
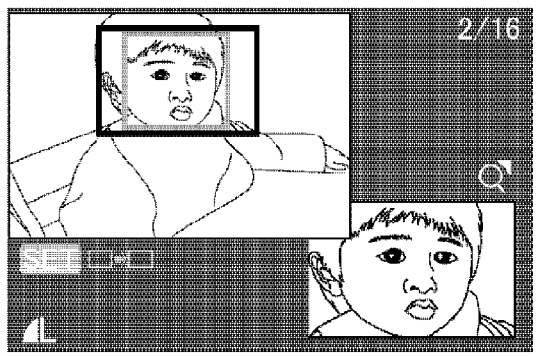
FIGS. 14A to 14D illustrate transition of review mode changing screens in the exemplary embodiment of the present invention.

First, the image display unit 28 comes into a display state of FIG. 14A (step S801). More specifically, the entire display region for displaying the entire captured image is displayed in the upper left side of the screen, and the enlarged display region for displaying part of the captured image is displayed in the lower right side of the screen in a smaller size than the entire display region that is displayed in the upper left side of the screen.

Figure 14B:
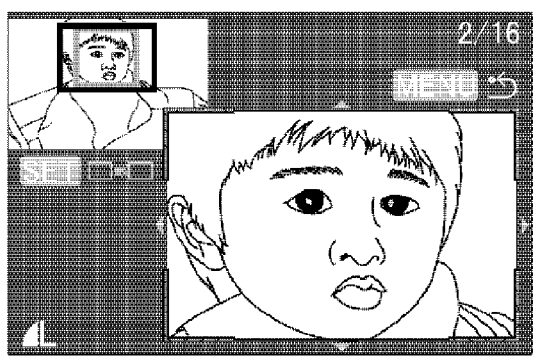

Then, if the zoom lever is pressed to the TELE side (step S802), the entire display region displayed in the upper left side of the screen is displayed in a smaller size and the enlarged display region displayed in the lower right side of the screen is displayed in a larger size, as shown in FIG. 14B (step S804). When an image displayed in the enlarged display region is, e.g., a human face or a registered object, of which region can be specified, such an image can be enlarged in a particular region without storing a magnification. If the zoom lever is pressed to the WIDE side in the reproducing mode (step S803), multiple images are displayed on the image display unit 28 (step S805).

Figure 14C:
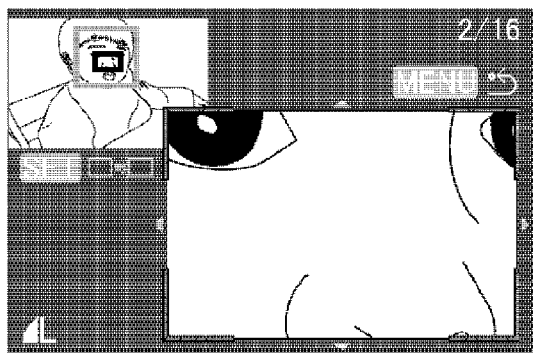
Figure 14D:
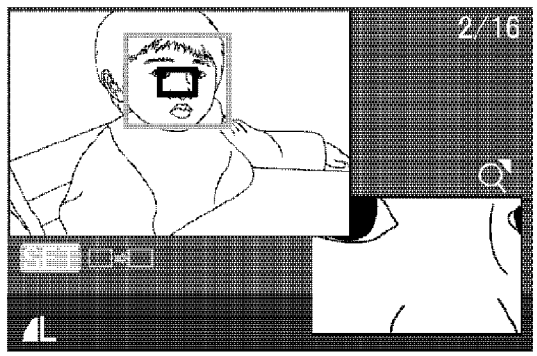

If the zoom lever is pressed to the TELE side in the state where the enlarged display region displayed in the lower right side of the screen is displayed in a larger size (step S806), the display magnification of the image displayed in the enlarged display region is increased (step S811). A display example on the image display unit 28 at that time is illustrated in FIG. 14C.

If the zoom lever is pressed to the WIDE side in the state where the enlarged display region displayed in the lower right side of the screen is displayed in a larger size (step S807), it is confirmed whether the display magnification is at a lower limit (step S809). If the display magnification is at the lower limit, that display magnification is stored (step S812) and the processing is returned to step S801. If the display magnification is not at the lower limit, the display magnification of the image is reduced (step S810).

If a MENU button is pressed in the state where the enlarged display region displayed in the lower right side of the screen is displayed in a larger size (step S808), the current display magnification is stored and the processing is returned to step S801. The display magnification can be temporarily stored in the system memory 52 only during the operation of the camera, or it can be stored in the non-volatile memory 56 so that the stored display magnification is made effective at the next startup.

As described above, it is possible to simply change over the display magnification between the captured image and the enlarged image as part of the former, change the magnification of the enlarged display, and to store the display magnification just by operating the zoom lever and the MENU button.

Also, when the predetermined operating member, such as the MENU button, is operated, the image display magnification is stored and the image can be displayed based on the stored display magnification in the next reproducing. Therefore, the review mode convenient for the user can be provided.

Additionally, the operating members are not limited to the zoom lever and the MENU button. Another button, e.g., a DISP button, can also be used instead of the MENU button.

Further, when the image advance is instructed in the state where the image displayed in the lower right side of the screen is displayed in a larger size, the display state can be returned to the state where the captured image displayed in the upper left side is displayed in a larger size (FIG. 14A), or the image can be advanced while maintaining the preceding display state. When the image is advanced while maintaining the preceding display state, the image can be enlarged in the initially displayed frame, or the image can be advanced while the enlargement coordinate position is held fixed. In addition, the review mode can also be changed depending on the photographing conditions of, e.g., images captured in the continuous shooting mode.

(Focus Confirmation)

Figure 9:
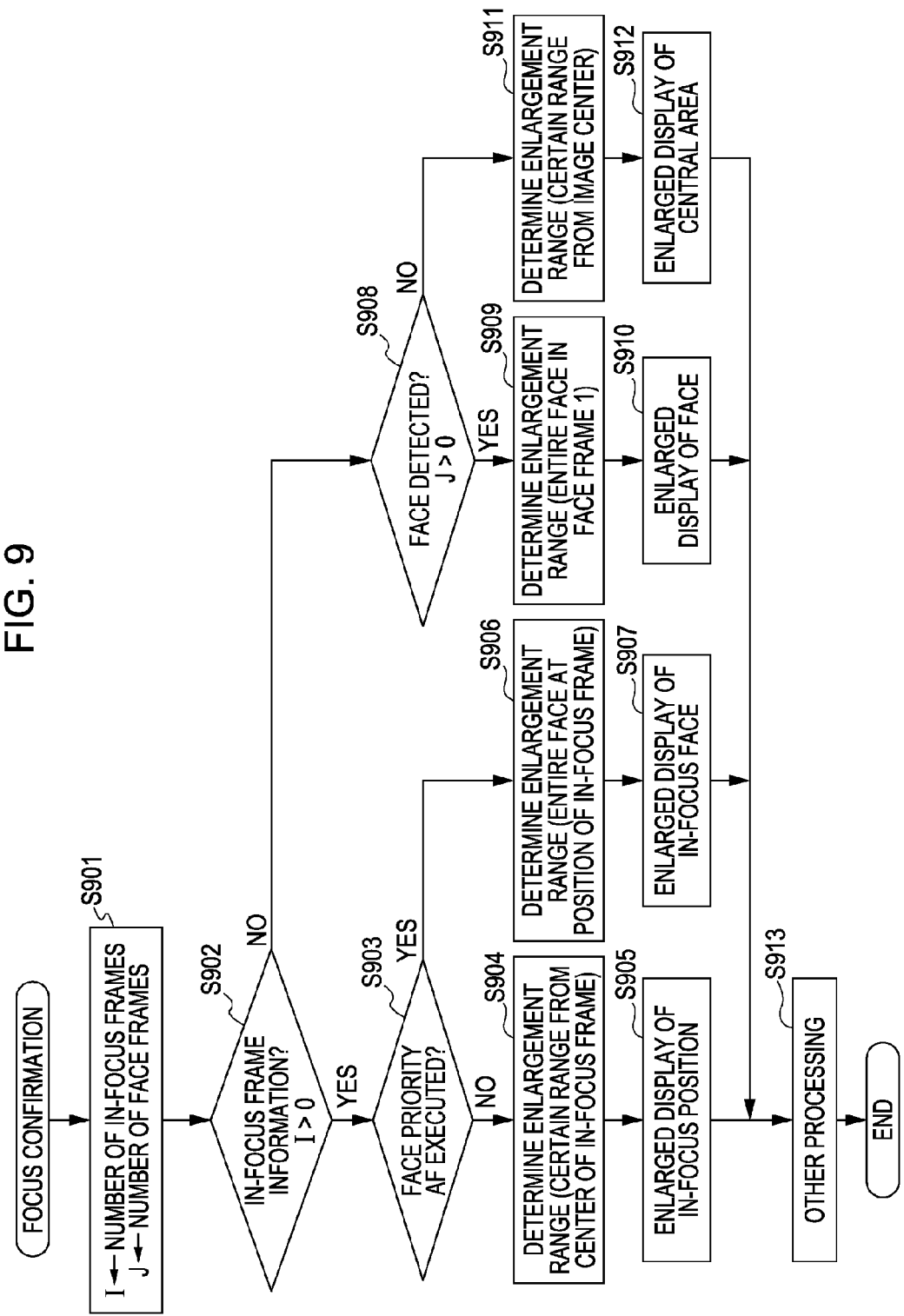
FIG. 9 is a flowchart illustrating a focus confirmation process in the exemplary embodiment of the present invention.

FIG. 9 is a flowchart illustrating the focus confirmation process in step S706 of FIG. 7.

First, in step S901, in-focus frame information and face information regarding an image are obtained from the system memory 52, and the total number of in-focus frames and the total number of face frames are set respectively to an in-focus frame number I and a face frame number J based on the obtained in-focus frame information and face information. It is here assumed that a number I of in-focus frames and a number J of face frames are sequenced respectively in the order of an in-focus frame 1>an in-focus frame 2> . . . >an in-focus frame I and a face frame 1>a face frame 2> . . . a face frame J. An index for the sequencing can be selected, for example, such that the in-focus frames are sequenced in the descending order of an AF evaluation value, and that the face frames are sequenced in the descending order of size and nearness to the center. Of course, the index for the sequencing is not limited to such an example.

Then, in step S902, the system control unit 50 determines whether the in-focus frame number I is larger than 0, i.e., whether there is an in-focus place in the image. If the presence of the in-focus place (i.e., the in-focus frame number I>0) is determined, the processing advances to step S903, and if the absence of the in-focus place is determined, the processing advances to step S908.

In step S903, the system control unit 50 determines whether the face priority AF has been executed. If it is determined that the face priority AF has not been executed, the processing advances to step S904, and if it is determined that the face priority AF has been executed, the processing advances to step S906.

In step S904, an enlargement range (image region) to be enlarged in an image under the REC review is determined. Herein, the enlargement range is determined as a range having a size at a certain proportion with respect to the size of the entire image under the REC review about the center of the in-focus frame (determination of the enlargement range is made based on information not indicating the size of the detected object). When there are plural in-focus frames, the enlargement range is determined for the in-focus frame 1 at the highest rank in accordance with the sequencing set in step S901. In addition to the above-described example, the enlargement range can also be provided as, e.g., a range that is optionally set by the user in advance, or a range falling within a later-described enlarged display region about the center of the in-focus frame with a pixel magnification of 100%. The range optionally set by the user in advance can be provided as a range having a relative proportion with respect to the size of the entire image, or a range indicated by the pixel magnification. An image captured by the other AF method than the face priority AF represents an image captured after the focus adjustment has been made with the photographer paying attention to an object other than a human face. However, the size of the in-focus frame is fixed and does not indicate the entire region of the object to which the photographer has paid attention. Thus, the size of the in-focus frame is assumed not to reflect the intent of the photographer, and a certain range from the center of the in-focus frame can be determined to be the enlargement range without being restricted to the entire range indicated by the in-focus frame. Thus, the image can be displayed in a manner allowing the user to closely confirm whether the object within the in-focus frame is in focus.

In step S905, the enlargement range (image region) in the image under the REC review, which has been determined in step S904, is displayed, along with the entire image, in an enlarged size so as to fall within the enlarged display region.

Figure 15A:
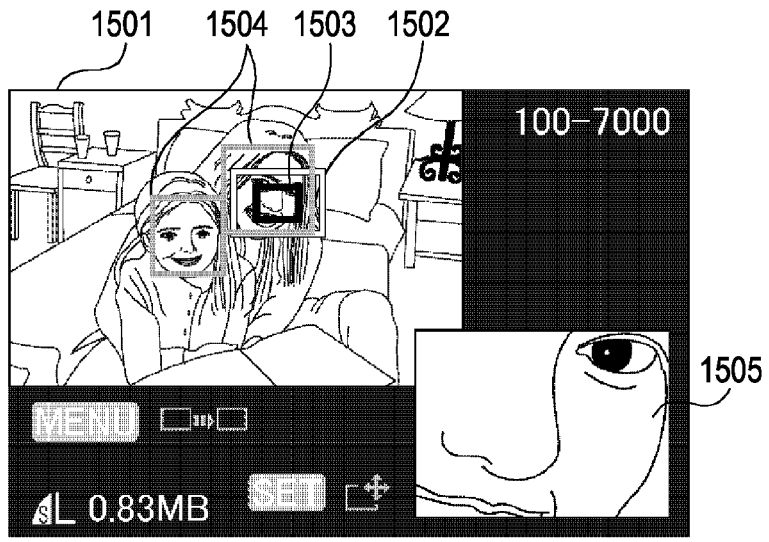
FIGS. 15A to 15C illustrate display examples of focus confirmation screens in the exemplary embodiment of the present invention.

FIG. 15A illustrates a display example in step S905. In an entire display region 1501, the image under the REC review is displayed in such a manner as allowing the entire image to be recognized. An in-focus frame 1502 displayed in a superimposed relation to the entire image, which is displayed in the entire display region 1501, represents a region in the image under the REC review, which has been made in focus by the focus adjustment in step S308 of FIG. 3. When there are plural in-focus frames, only the in-focus frame 1 can be displayed, or the plural in-focus frames can be all displayed with the in-focus frame 1 displayed in a color differing from that of the other in-focus frames. A partial enlargement frame 1503 also displayed in a superimposed relation to the entire image is a frame defining the region that has been determined in step S904, and it represents a region in the entire image which is displayed in an enlarged display region 1505. Face frames 1504 represent the face frames 1 to J obtained based on the face information that has been detected by the face detection at the time of shooting and that is stored in the system memory 52. In the enlarged display region 1505, the range of part of the image displayed in the entire display region 1501, which is indicated by the partial enlargement frame 1503, is displayed in an enlarged size so as to fall within the enlarged display region 1505. The in-focus frame 1502, the partial enlargement frame 1503, and the face frames 1504 are displayed in different colors so that respective meanings of those frames can be recognized from the colors. By displaying those frames, the user can quickly confirm the entire image under the REC review, in which part of the image under the REC review the focus adjustment has been made, and the degree of in-focus at the position having been subjected to the focus adjustment.

In step S906, as the enlargement range to be enlarged in an image under the REC review, a range (image region) is determined which encompasses the entirety of a face included in the in-focus frame 1 (determination of the enlargement range is made based on the object information). An image captured by the face priority AF has a high probability that the image is captured by the photographer paying attention particularly to a human face. Therefore, the range encompassing the entirety of the face included in the in-focus frame 1 is determined to be the enlargement range so that the human face as the target object can be closely confirmed.

More specifically, a region obtained by enlarging or reducing a face region indicated by the face information regarding a face, which is included in the in-focus frame 1 or in a portion of the in-focus frame 1 having been subjected to the focus adjustment during the face priority AF, is determined as the enlargement range. Because the in-focus frame 1 is a frame having been subjected to the face priority AF, the face is included in the in-focus frame in most cases. Thus, the enlargement range is determined so that the entirety of the face included in the in-focus frame 1 can be confirmed. In the face detection process described with reference to FIG. 4, the face region is determined based on the extracted candidate groups of the eyes, the nose, the mouth, and the ears in the face. Accordingly, a region representing the entirety of an actual face including other face portions (e.g., the contour and hairs), which have not been used in the face detection, is not always included in the face region represented by the face information. For that reason, the processing is executed to determine, as the enlargement range, a region obtained by enlarging the face region represented by the face information at a particular magnification so as to include the entire face.

Figure 15B:
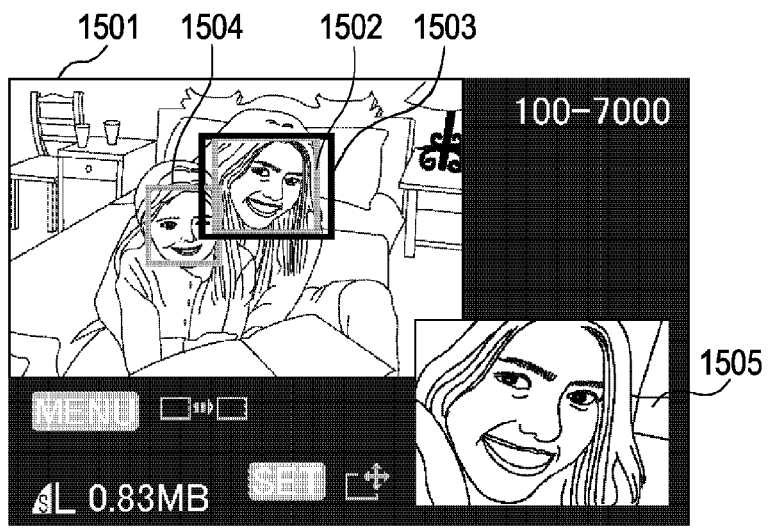
Figure 15C:

FIG. 15C illustrates an example of that processing. A face region 1506 represented by the face information, which has been obtained with the face detection process, indicates only the portion used in the determination for the face detection process, and it is smaller than the entirety of the actual face. Therefore, the region obtained by enlarging the face region 1506 represented by the face information at the particular magnification so as to include the entire face is determined as the enlargement range. The thus-determined enlargement range is displayed as the partial enlargement frame 1503 in step S907 described below. Because the in-focus frame 1502 is also subjected to the face priority AF and its size is determined based on the face region 1506 represented by the face information, the enlargement range can also be determined from the in-focus frame 1502 instead of the face region 1506 represented by the face information. An enlargement/reduction factor used in determining the enlargement range depends on which part of the face has been used in the face detection process to determine the face region, and it is a value depending on a face detection algorithm.

In step S907, the range of part of the image under the REC review, which has been determined in step S906 and encompasses the entirety of the face included in the in-focus frame 1, is displayed, along with the entire image, in an enlarged or reduced size so as to fall within the enlarged display region.

FIG. 15B illustrates a display example in step S907. The entire display region 1501, the in-focus frame 1502, and the face frames 1504 are the same as those in FIG. 15A. Note that, in this exemplary embodiment, since the in-focus frame having been subjected to the face priority AF has the same range as that of the face frame 1, the in-focus frame 1502 displayed here is assumed to also display the face frame 1. The partial enlargement frame 1503 is a frame defining the region that has been determined in step S906, and it represents a region in the entire image which is displayed in the enlarged display region 1505. Unlike the partial enlargement frame 1503 in FIG. 15A, the partial enlargement frame 1503 in FIG. 15B defines, as described above, the region encompassing the entirety of the face included in the in-focus frame 1. In the enlarged display region 1505, the range of part of the image displayed in the entire display region 1501, which is indicated by the partial enlargement frame 1503, is displayed in an enlarged size so as to fall within the enlarged display region 1505. While the region is displayed in an enlarged size in the illustrated example, the region is displayed in a reduced size when the region encompassing the entirety of the face included in the in-focus frame 1 on the image displayed in the entire display region 1501 is larger than the enlarged display region 1505. By providing the display in such a manner, the user can quickly confirm, for example, the entire image under the REC review, which person in the image under the REC review is in focus, and an expression of the in-focus person. In other words, the user can make confirmation while particularly taking note of the target person, i.e., the object to which the user has paid attention at the time of shooting. Additionally, it is advantageous to display the image in such a manner as allowing the user to recognize, based on frame colors, icons or characters, that the range displayed in the enlarged display region 1505 or the partial enlargement frame 1503 in the entire display region 1501 in step S907 differs from the range displayed in step S905.

In step S908, the system control unit 50 determines whether the face frame number J is larger than 0, i.e., whether there is a face in the image. If the presence of the face (i.e., the face frame number J>0) is determined, the processing advances to step S909, and if the absence of the face is determined, the processing advances to step S911.

In step S909, for the face frame 1 set in step S901, a range obtained by enlarging or reducing the face region represented by the face information is determined as the enlargement range (determination of the enlargement range is made based on the object information). A method of determining the enlargement range by enlarging or reducing the face region represented by the face information is as per described above with reference to FIG. 15C. Herein, because of the in-focus frame being not present, if the face is detected, the region including the entirety of the face, which has been detected as an object meaningful for detailed confirmation, is determined as the enlargement range.

In step S910, face frames representing the face frames 1-J and the enlargement range determined in step S909 as the partial enlargement frame are displayed in a superimposed relation to the entire display region. Further, the region indicated by the partial enlargement frame is displayed, along with the entire image, in an enlarged or reduced size at such a magnification as to fall within the enlarged display region.

In step S911, a range having a size at a certain proportion with respect to the size of the entire image about the center of the image is determined as the enlargement range (determination of the enlargement range is made based on information differing from the object information).

In step S912, the enlargement range determined in step S911 is displayed as the partial enlargement frame in a superimposed relation to the entire display region. Further, the region indicated by the partial enlargement frame is displayed, along with the entire image, in an enlarged or reduced size so as to fall within the enlarged display region. Because there is neither the in-focus frame nor the face frame in this case, only the partial enlargement frame is displayed in a superimposed relation in the entire display region.

When the display processing in steps S905, S907, S910 and S912 is completed, the focus confirmation process is brought to an end after accepting, in step S913, other processing that can be executed during the REC review.

While the enlargement range is determined in this exemplary embodiment after determining in step S903 whether the image has been captured after execution of the face priority AF, some other method can also be used so long as it can determine, as the enlargement range, a range confirmable as being particularly specified for the object to which the photographer has paid attention at the time of shooting. For example, when an image can be confirmed as being one where the exposure control, the white balance control, the light control, etc. are executed instead of the face priority AF on an object which is not limited to a face and has been detected at the time of shooting, such an image is presumably captured by the photographer paying attention to the detected object. In that case, a range including the entirety of the object having been subjected to the exposure control, the white balance control, the light control, etc. can also be determined as the enlargement range. An example of the object detectable at the time of shooting is a red eye.

Further, the determination in step S908 is not limited to the determination regarding the presence of a face. The enlargement range can also be set by determining whether some other object, e.g., a red eye, than a face is detected, and by selecting a region including the entirety of the detected object in accordance with the determination.

With this exemplary embodiment, an appropriate display for confirmation can be provided after determining whether the displayed image is an image in which the focus adjustment has been made with the user paying attention to a particular portion instead of a particular object, or an image which has been captured with the user paying attention to a particular detected object, e.g., a face. Further, an appropriate display for confirmation can be provided depending on whether the image has an in-focus region, or whether a particular object, e.g., a face, is detected. In other words, the image can be displayed in such a manner as allowing the user to easily confirm the region of attention, which differs for each image.

(Input Waiting in Reproducing Mode)

Figure 10A:
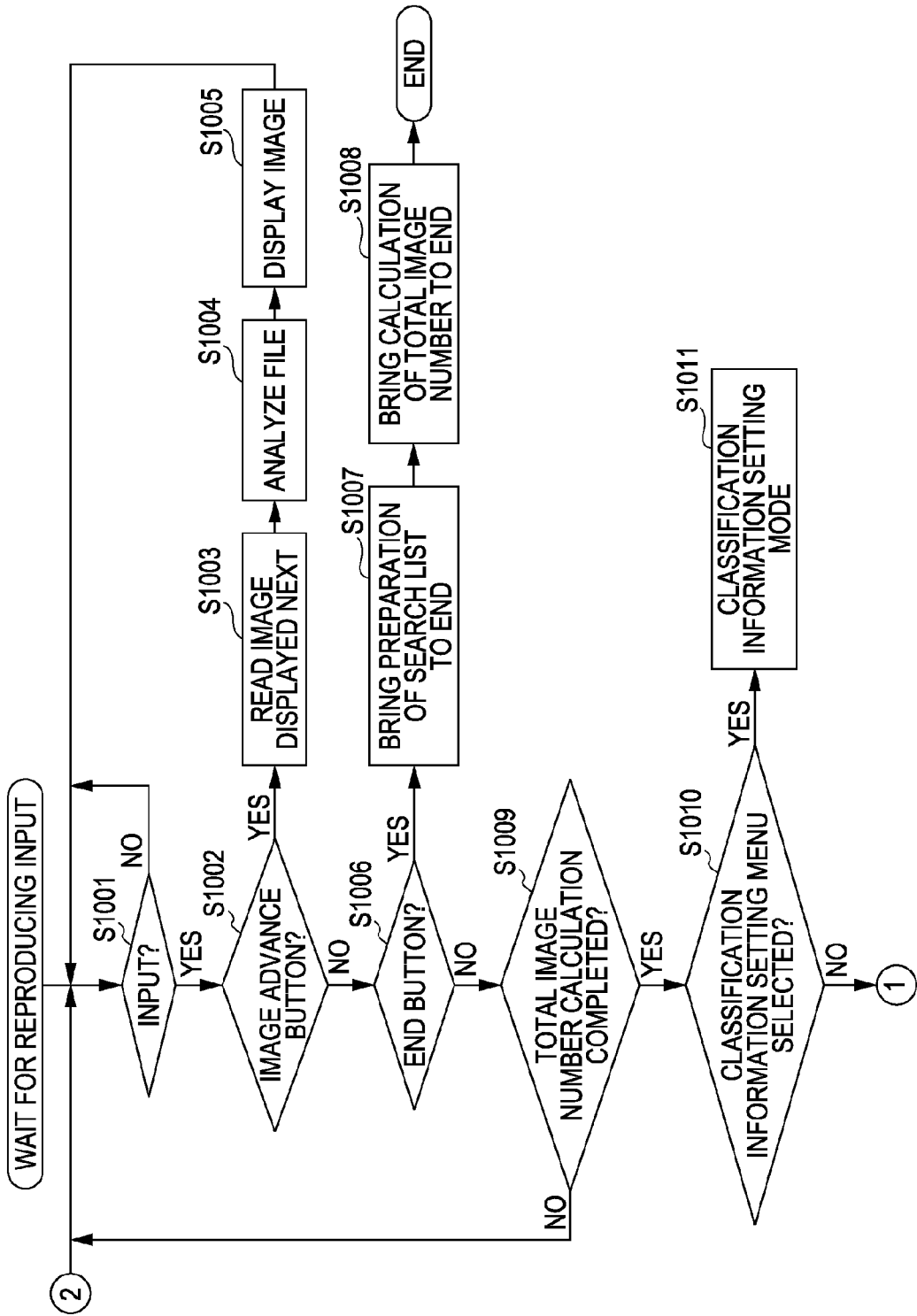
FIGS. 10A and 10B are flowcharts illustrating a reproducing input waiting process in the exemplary embodiment of the present invention.
Figure 10B:
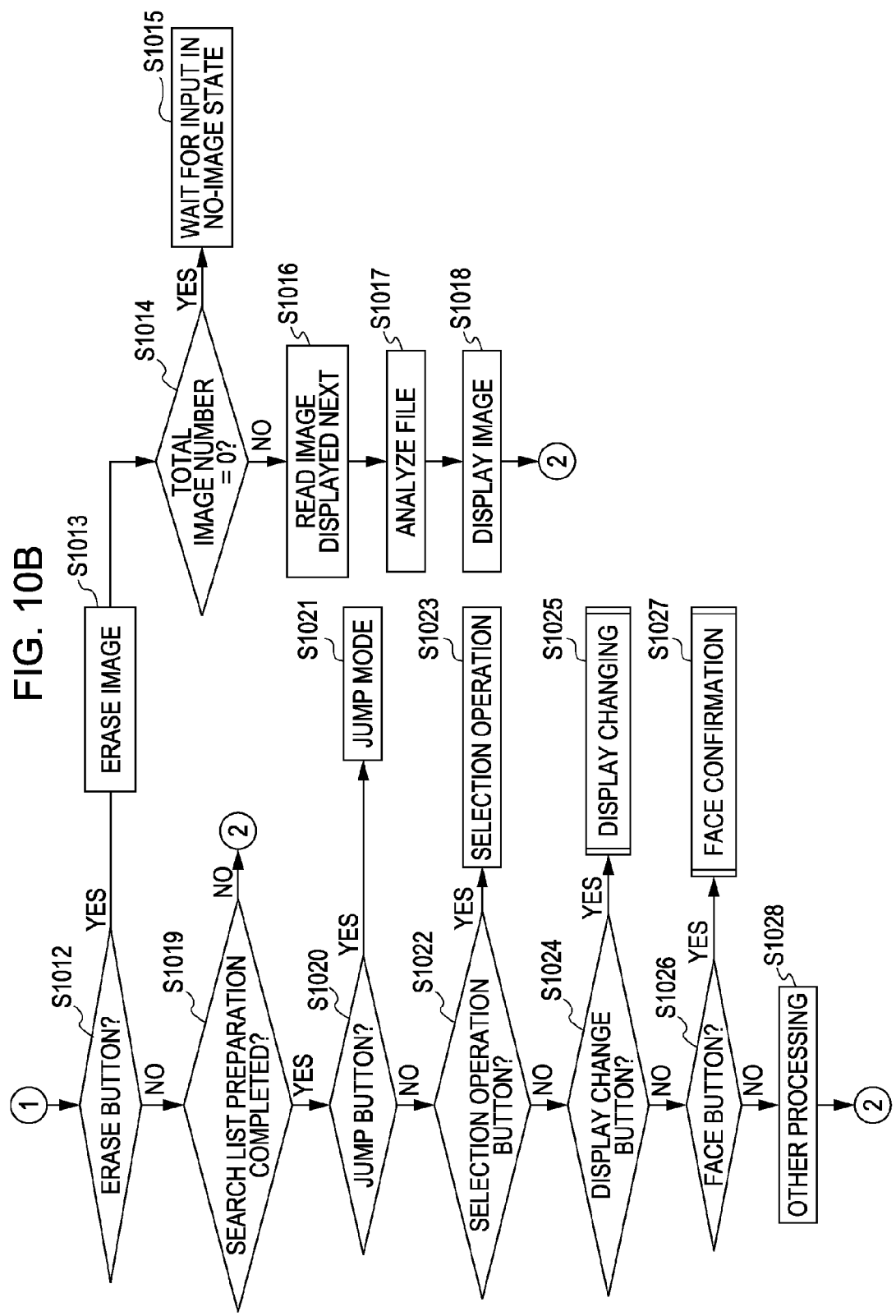

FIG. 10 is a flowchart illustrating processing in an input waiting state in the reproducing mode.

In step S1001, the system control unit 50 checks an operation input from the user. The operation input means herein an operation of a button or a battery cover by the user, an event indicating a power reduction, etc. If there is no input, the system control unit 50 waits for coming-in of an input. If any operation input is detected, the processing advances to step S1002.

In step S1002, the system control unit 50 determines whether the detected operation input is from the image advance button included in the operating units 70. If the detected operation input is from the image advance button, the processing advances to step S1003 in which the system control unit 50 reads the next displayed image. The image advance button is constituted by a pair of buttons corresponding to respective advance directions, and the next displayed image is read depending on the advance direction corresponding to the operated button. In step S1004, the system control unit 50 executes a file analysis process, including the photographing information, the attribute information, etc., on image data read in step S1003. In step S1005, the system control unit 50 displays the image data read in step S1003. At that time, the photographing information, the attribute information, etc. are also displayed based on the result of the file analysis process in step S1004. Further, if it is determined from the file analysis result in step S1004 that the obtained data is incorrect, for example, if part of the file is broken, an error indication is also performed. After completion of the display, the processing is returned to the input waiting state in step S1001.

If it is determined in step S1002 that the input is not from the image advance button, the system control unit 50 determines in step S1006 whether the detected operation input is from an end button. If the input is determined to be from the end button, the processing advances to step S1007 in which the system control unit 50 brings the search list preparation process to an end. If the search list is under preparation, the preparation process is interrupted, and if the search list is already completed, nothing is executed. In step S1008, the system control unit 50 executes an ending process for the calculation of the total number of images. As in step S1007, if the total image number calculation is under execution, the calculation process is interrupted, and if it is already completed, nothing is executed. Then, the processing in the reproducing mode is brought to an end, following which the processing advances to step S210 of FIG. 2.

If the operation input is determined in step S1006 to be not from the end button, the processing advances to step S1009. In step S1009, the system control unit 50 checks whether the total image number calculation process having started in step S606 (FIG. 6) is completed. If the calculation process is not yet completed, the processing is returned to the operation input waiting state of step S1001. At that time, a message or an icon can be displayed to indicate that the calculation process is not yet completed. With the processing described above, the image advance operation by the image advance button and the ending operation by the end button are executed without waiting for completion of the total image number calculation, while other operation inputs are ignored until the total image number calculation process is completed.

If it is determined in step S1009 that the total image number calculation is completed, the processing advances to step S1010. In step S1010, the system control unit 50 determines whether a classification information setting menu is selected by an operation of the operating unit 70. If the determination result indicates that the classification information setting menu is selected, the processing advances to step S1011 in which the system control unit 50 executes the processing in a classification information setting mode. If it is determined in step S1010 that the classification information setting menu is not selected, the processing advances to step S1012.

In step S1012, the system control unit 50 checks whether the detected operation input is from the erase button included in the operating units 70. If the operation input is determined to be from the erase button, the processing advances to step S1013. In step S1013, the system control unit 50 executes erasure of the image data currently displayed in the image display unit 28. If the erasure of the image data is completed, the system control unit 50 checks the total number of images after the erasure in step S1014. If the total number of images is 0, the processing advances to step S1015 for transition to an input waiting state in a no-image state.

On the other hand, if image data remains after the erasure, the processing advances to step S1016 in which the system control unit 50 reads image data of a next display target to display the next image data. Herein, the image data of the next display target is assumed to be image data of the file number next to that of the erased image data. When the latest image data is erased, the image data of the file number preceding one from that of the erased image data is selected as the next display target. In step S1017, the system control unit 50 executes the file analysis process on the image data that has been read as the display target in step S1016, thereby obtaining the photographing information, the attribute information, etc. In step S1018, the system control unit 50 displays, on the image display unit 28, the image data that has been read in step S1016. At that time, the photographing information, the attribute information, etc. are also displayed. Further, if it is determined from the file analysis result in step S1017 that the obtained data is incorrect, for example, if part of the file is broken, an error indication is also performed. After completion of the display, the processing is returned to the operation input waiting state in step S1001.

If it is determined in step S1012 that the operation input is not from the erase button, the processing advances to step S1019. In step S1019, the system control unit 50 checks whether the search list preparation process having started in step S607 (FIG. 6) is completed. If the search list preparation process is not yet completed, the processing is returned to the operation input waiting state of step S1001. At that time, as in the above-described case where the total image number calculation is not yet completed, a message or an icon can be displayed to indicate that the search list preparation process is not yet completed. With the processing described above, other operation inputs than the above-described ones are ignored until the search list preparation process is completed. The processing for the above-described operation inputs includes the image advance operation (S1002-S1005), the ending operation (S1006-S1008), the execution of the classification information setting mode (S1010 and S1011), and the image erase operation (S1012-S1018).

If it is determined in step S1019 that the search list preparation is completed, the processing advances to step S1020. In step S1020, the system control unit 50 determines whether the detected operation input is a jump instruction. If the operation input is determined to be the jump instruction, the processing transits to a jump mode in step S1021.

If the operation input is determined to be not the jump instruction, the processing advances to step S1022 in which the system control unit 50 determines whether the detected operation input instructs a selection operation. If the determination result indicates that the operation input instructs the selection operation, the processing transits to the selection operation in step S1023.

If the determination result indicates that the operation input does not instruct the selection operation, the processing advances to step S1024 in which the system control unit 50 determines whether the detected operation input instructs a display change. If the determination result indicates that the operation input instructs the display change, the processing transits to a display changing process in step S1025. The display changing process will be described later with reference to FIG. 11.

If the determination result indicates that the operation input does not instruct the display change, the processing advances to step S1026 in which the system control unit 50 determines whether the detected operation input instructs face confirmation. If the determination result indicates that the operation input instructs the face confirmation, the processing transits to a face confirmation process in step S1027. The face confirmation process will be described later with reference to FIG. 13.

If the determination result in step S1026 indicates that the operation input does not instruct the face confirmation, the processing advances to step S1028. When there is no operating member for instructing the face confirmation, such as a face button, the processing also advances to step S1028. In step S1028, the system control unit 50 executes processing corresponding to other operation inputs than the above-described ones. Such processing includes, for example, an image editing process, a change to multi-reproducing, and a menu display using the menu button. The term "multi-reproducing" means a reproducing mode in which a plurality of reduced images contained in image data are displayed side by side on one screen of the image display unit 28.

(Display Change)

Figure 11:
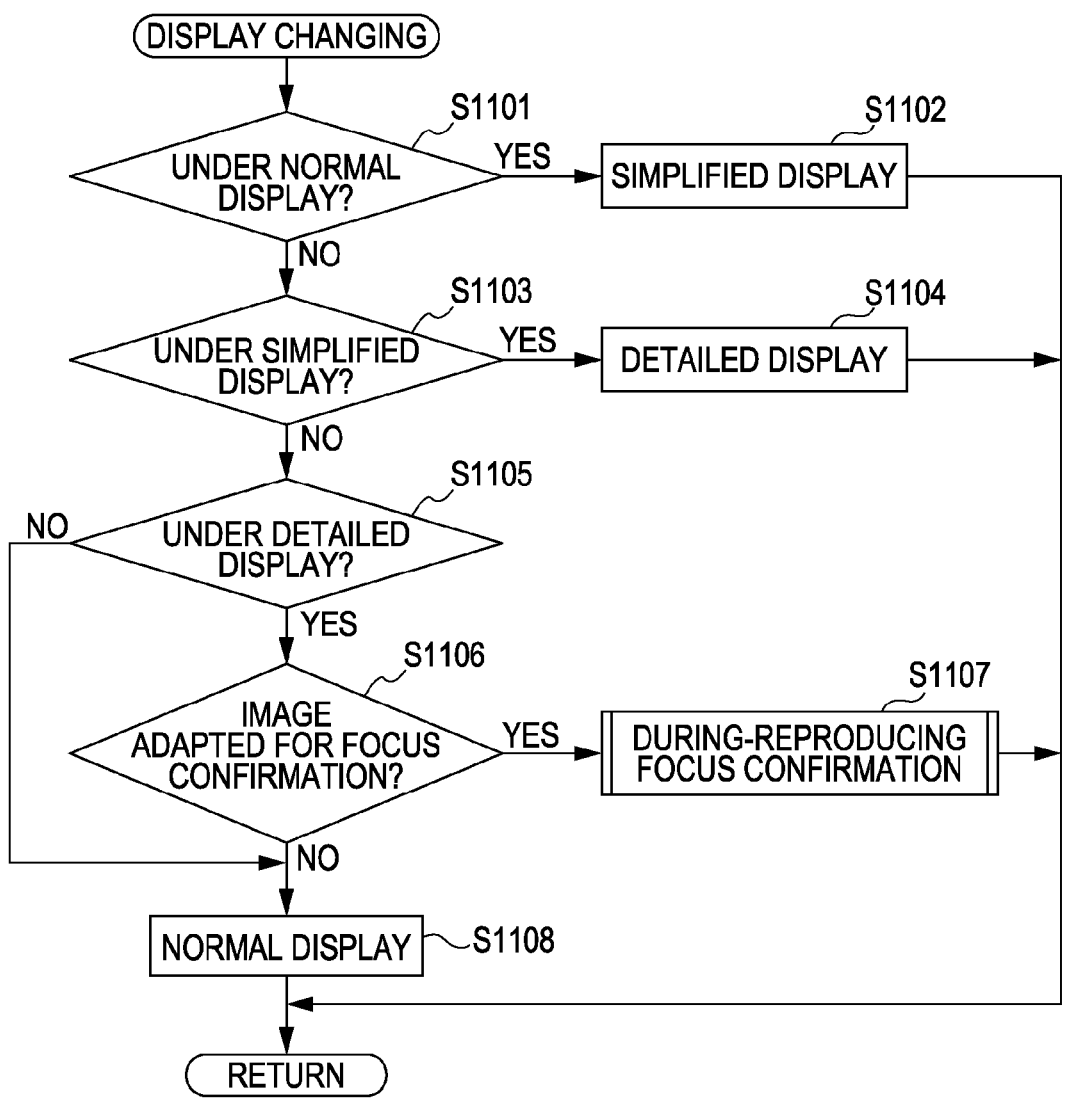
FIG. 11 is a flowchart illustrating a display changing process in the exemplary embodiment of the present invention.

FIG. 11 is a flowchart illustrating the display changing process in step S1025 of FIG. 10.

In step S1101, the system control unit 50 refers to the current display mode that is temporarily stored in the system memory 52, and executes a simplified display process if the current display mode is "normal display" (step S1102). In the simplified display process, the system control unit 50 displays, in addition to the captured image stored in the memory 32, a series of information including, e.g., the file number and the date on the image display unit 28 through the memory control unit 15. Further, the system control unit 50 updates the current display mode, which is temporarily stored in the system memory 52, to the simplified display. If the current display mode is not "normal display" (step S1102), the processing advances to step S1103.

In step S1103, the system control unit 50 refers to the current display mode that is temporarily stored in the system memory 52, and executes a detailed display process if the current display mode is "simplified display" (step S1104). In the detailed display process, the system control unit 50 displays, in addition to the captured image stored in the memory 32 and the simplified information displayed in the simplified display process of step S1102, the detailed photographing information including, e.g., the exposure and histograms on the image display unit 28 through the memory control unit 15. Further, the system control unit 50 updates the current display mode, which is temporarily stored in the system memory 52, to the detailed display. If the current display mode is not "simplified display" (step S1103), the processing advances to step S1105.

In step S1105, the system control unit 50 refers to the current display mode that is temporarily stored in the system memory 52. If the current display mode is "detailed display", it determines whether the currently reproduced image is adapted for a focus confirmation process (step S1106). The image not adapted for the focus confirmation process is, for example, an unrecognizable image or a moving image. If the reproduced image is determined in step S1106 to be adapted for the focus confirmation process, the processing advances to a during-reproducing focus confirmation process (step S1107). The during-reproducing focus confirmation process will be described later with reference to FIG. 12.

If the current display mode is determined in step S1105 to be not "detailed display" and if the reproduced image is determined in step S1106 to be not adapted for the focus confirmation process, the system control unit 50 executes a normal display process (step S1108). In the normal display process, the system control unit 50 displays only the captured image stored in the memory 32 on the image display unit 28 through the memory control unit 15. Further, the system control unit 50 updates the current display mode, which is temporarily stored in the system memory 52, to the normal display.

(During-Reproducing Focus Confirmation)

Figure 12A:
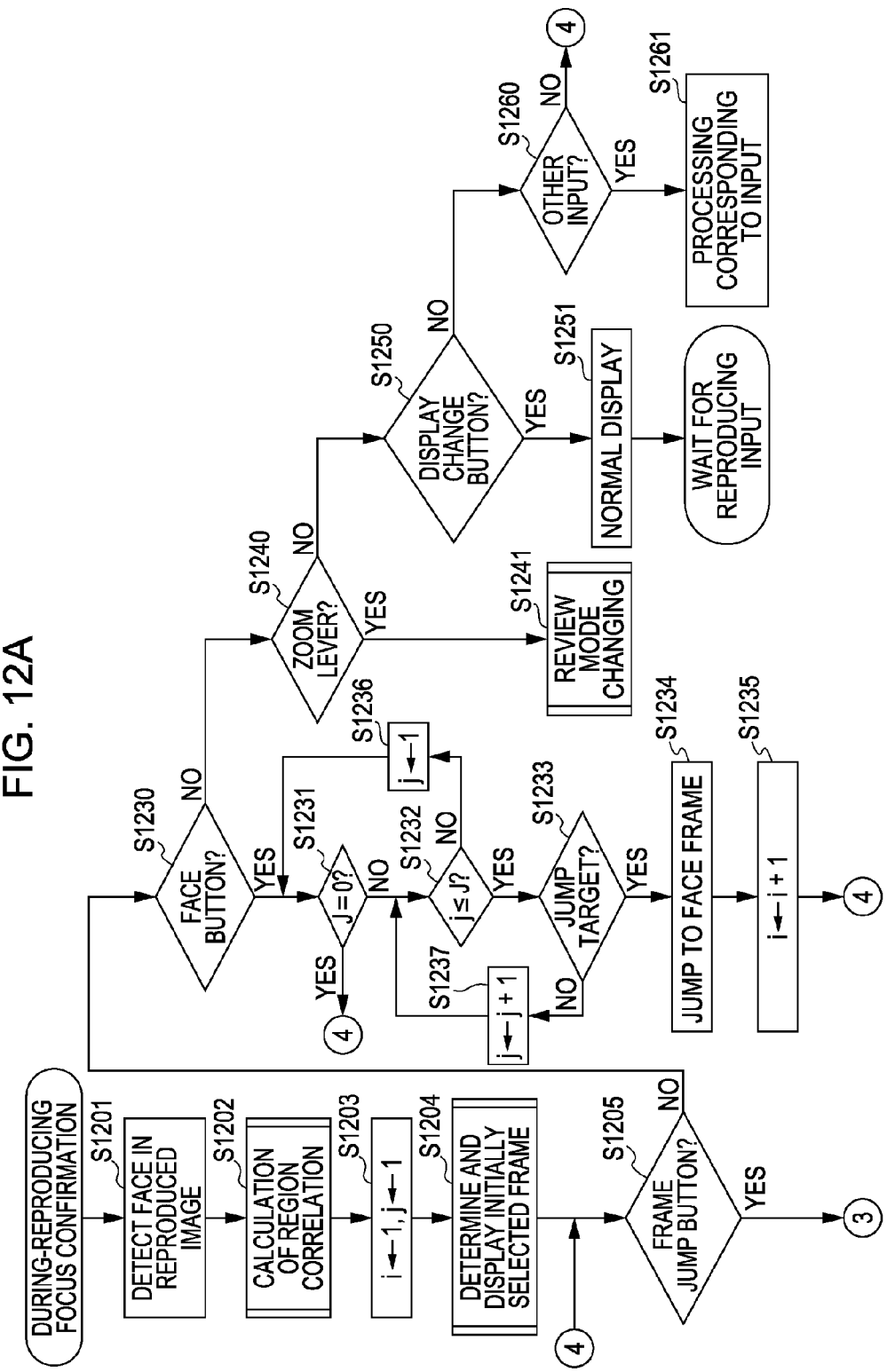
FIGS. 12A and 12B are flowcharts illustrating a during-reproducing focus confirmation process in the exemplary embodiment of the present invention.
Figure 12B:
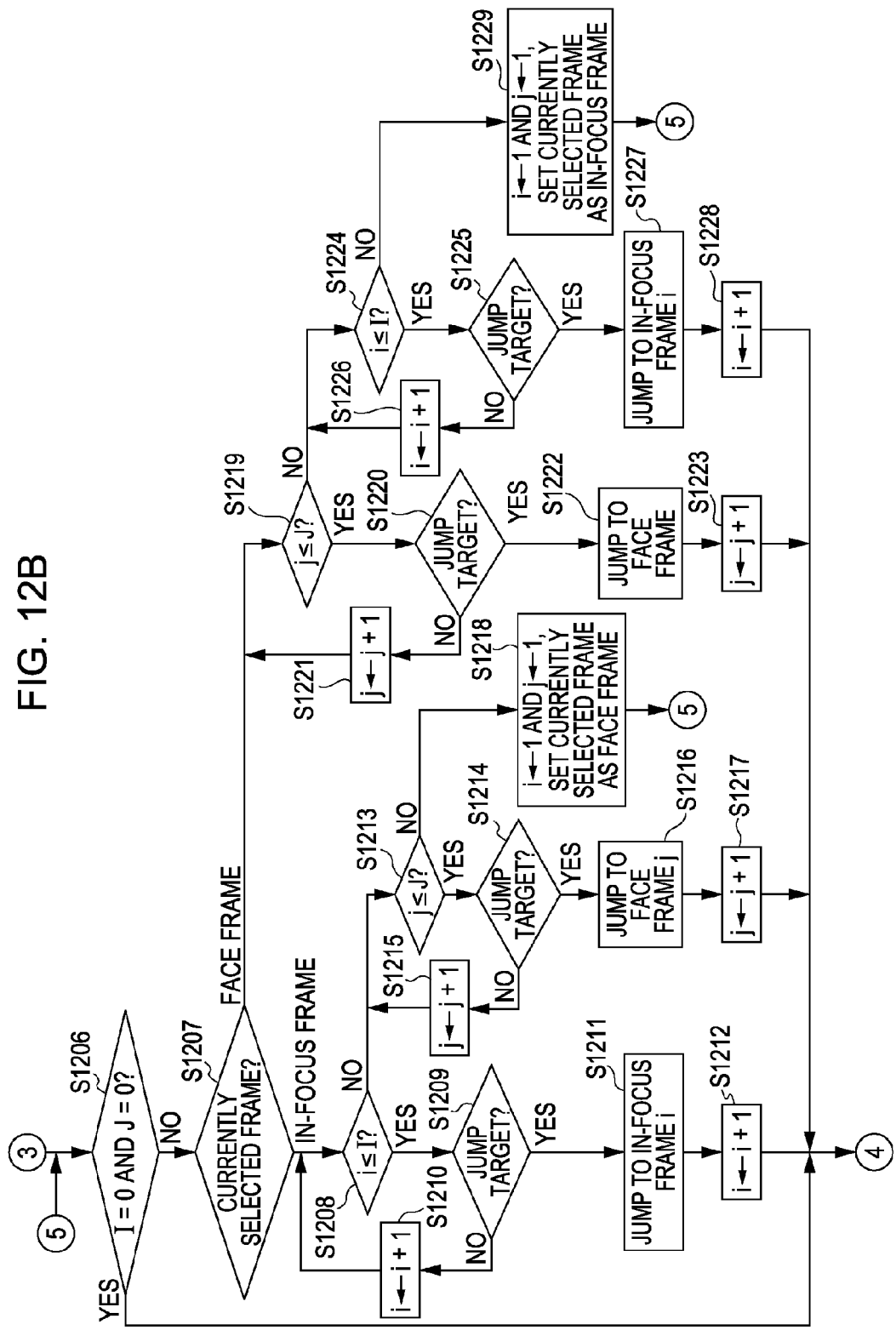

FIG. 12 is a flowchart illustrating the during-reproducing focus confirmation process in step S1107 of FIG. 11.

First, in step S1201, the system control unit 50 executes an image analysis on the reproduced image that is stored in the memory 32, and performs the face detection process described above with reference to FIG. 4.

Then, in step S1202, the system control unit 50 calculates the correlation between the detected face region and the region of the in-focus frame. When the calculation result provides a high degree of correlation, a jump target is changed. Details of the calculation of the region correlation will be described later with reference to FIG. 18. It is herein assumed that the total number of faces detected in step S1201 is a face frame number J, and the total number of in-focus frames, which is obtained by referring to added information regarding the captured image under reproducing, is an in-focus frame number I. Also, at that time, a number I of in-focus frames and a number J of face frames are assumed to be sequenced respectively in the order of an in-focus frame 1>an in-focus frame 2> . . . >an in-focus frame I and a face frame 1>a face frame 2> . . . a face frame J.

In step S1203, a frame index is initialized. More specifically, "i" is an index representing a next candidate for enlarged display among the in-focus frames, and "j" is an index representing a next enlarged display candidate among the face frames. Those indexes are both initialized to 1 in step S1203.

In step S1204, the system control unit 50 determines whether a frame which first becomes a partial enlargement target is selected as the in-focus frame or the face frame, and it executes an initial display. The initially-selected-frame determination and display process will be described later with reference to FIG. 16.

In step S1205, it is determined whether a frame jump button included in the operating units 70 is operated. If the frame jump button is operated, the processing advances to step S1206, and if the frame jump button is not operated, the processing advances to step S1230.

In step S1206, it is determined whether the in-focus frame number I and the face frame number J are both 0. If the in-focus frame number I and the face frame number J are both 0, the processing is returned to step S1205, and if at least one of the in-focus frame number I and the face frame number J is not 0, the processing advances to step S1207.

In step S1207, it is determined whether the currently selected frame is the in-focus frame or the face frame. If the in-focus frame is selected, the processing advances to step S1208, and if the face frame is selected, the processing advances to step S1219.

In step S1208, it is determined whether the index i of the next display candidate among the in-focus frames does not exceed the in-focus frame number I. If the index i does not exceed the in-focus frame number I (i.e., i≦I), the processing advances to step S1209, and the index i exceeds the in-focus frame number I (i.e., i>I), the processing advances to step S1213.

In step S1209, the system control unit 50 refers to an in-focus frame information list recorded in the system memory 52 and determines whether the i-th in-focus frame is the jump target. The in-focus frame information list will be described later with reference to FIGS. 18 and 19. If the i-th in-focus frame is not the jump target, the processing advances to step S1210 in which the index i is incremented. The processing is then returned to step S1208. If the i-th in-focus frame is the jump target, the processing advances to step S1211.

In step S1211, the selected frame is jumped to the i-th in-focus frame. More specifically, the just preceding selected frame is changed to the in-focus frame i, and the range of part of the reproduced image, which has been displayed in an enlarged size just before, is changed to a range determined based on the in-focus frame i. The range determined based on the in-focus frame i is the same as that described above with reference to FIG. 9. At that time, if the reproduced image is an image captured after execution of the face priority AF, a region including an entire face can be set as the enlargement range based on the in-focus frame.

Figure 17A:
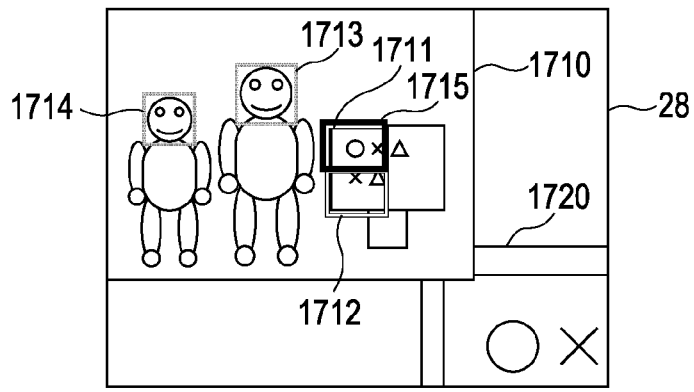
FIGS. 17A to 17D illustrate display examples of during-reproducing focus confirmation screens in the exemplary embodiment of the present invention.
Figure 17B:
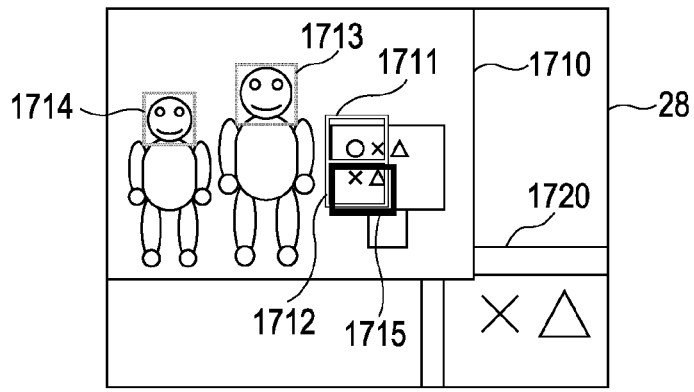

FIG. 17B illustrates a display example in step S1211.

FIGS. 17A to 17D illustrate display examples provided on the image display unit 28. In an entire display region 1710, the reproduced image is displayed in such a manner as allowing the entire image to be recognized. An in-focus frame 1711 (in-focus frame 1), an in-focus frame 1712 (in-focus frame 2), a face frame 1713 (face frame 1), a face frame 1714 (face frame 2), and a partial enlargement frame 1715 are displayed in a superimposed relation to the entire display region 1710.

A range of part of the reproduced image displayed in the entire display region 1710, which is indicated by the partial enlargement frame 1715, is displayed in an enlarged size in an enlarged display region 1720. Assuming the index i=2 to be set at the time of step S1211, the image is displayed as illustrated in FIG. 17B at the time of step S1211. A just preceding display is as illustrated in FIG. 17A. Comparing FIGS. 17A and 17B, the partial enlargement frame 1715 in which the in-focus frame 1 (in-focus frame 1711) has been selected and displayed in FIG. 17A is jumped to the in-focus frame 2 (in-focus frame 1712) in FIG. 17B, and the display in the enlarged display region 1720 is also changed in FIG. 17B corresponding to the range indicated by the partial enlargement frame 1715.

In step S1212, the index i of the in-focus frame is incremented to update the in-focus frame display candidate to the next in-focus frame. The processing is then returned to step S1205.

If the index i exceeds the in-focus frame number I (i.e., i>I) in step S1208, the processing advances to step S1213. In step S1213, it is determined whether the index j of the face frame exceeds the face frame number J (i.e., j≦J). If the index j does not exceed the face frame number J (i.e., j≦J), the processing advances to step S1214, and if the index j exceeds the face frame number J (i.e., j>J), the processing advances to step S1218.

In step S1214, the system control unit 50 refers to a face frame information list recorded in the system memory 52 and determines whether the j-th face frame is the jump target. The face frame information list will be described later with reference to FIGS. 18 and 19. If the j-th face frame is not the jump target, the processing advances to step S1215 in which the index j is incremented. The processing is then returned to step S1213. If the j-th face frame is the jump target, the processing advances to step S1216.

In step S1216, the selected frame is jumped to the j-th face frame. More specifically, the just preceding selected frame is changed to the face frame j, and the range of part of the reproduced image, which has been displayed in an enlarged size just before, is changed to a range determined based on the face frame j. The range determined based on the face frame j is the same as that described above with reference to FIG. 9. At that time, a region including an entire face can be set as the enlargement range based on the face information of the reproduced image.

Figure 17C:
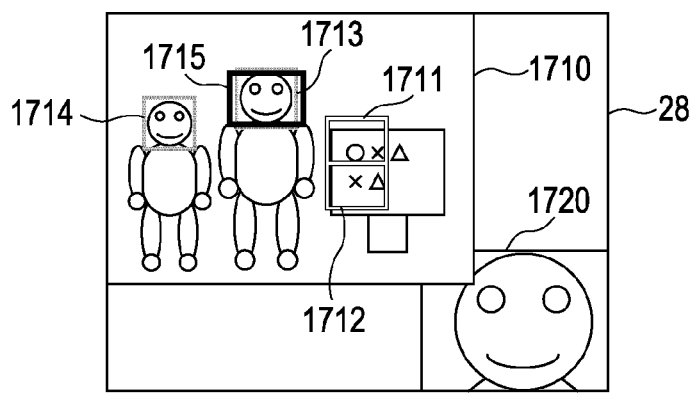

FIG. 17C illustrates a display example in step S1216.

Assuming the index j=1 to be set at the time of step S1216, the image is displayed as illustrated in FIG. 17C at the time of step S1216. A just preceding display is as illustrated in FIG. 17B. Comparing FIGS. 17B and 17C, the partial enlargement frame 1715 in which the in-focus frame 2 (in-focus frame 1712) has been selected and displayed in FIG. 17B is jumped to the face frame 1 (face frame 1713) in FIG. 17C, and the display in the enlarged display region 1720 is also changed in FIG. 17C corresponding to the range indicated by the partial enlargement frame 1715.

In step S1217, the index j of the face frame is incremented to update the face frame display candidate to the next face frame. The processing is then returned to step S1205.

If the index j of the face frame exceeds the face frame number J in step S1213, this means that a series of processes for selecting each of all the in-focus frames and face frames and displaying the selected frame in an enlarged size have been completed in step S1218. Therefore, after setting both the indexes i and j to 1 and setting the currently selected frame to the face frame in step S1218, the processing is returned to step S1206. In such a manner, the in-focus frames and the face frames can be repeatedly displayed in an enlarged size.

If the currently selected frame is the face frame in step S1207, the processing advances to step S1219. In step S1219, it is determined whether the index j of the next display candidate among the face frames does not exceed the face frame number J. If the index j does not exceed the face frame number J (i.e., j≦J), the processing advances to step S1220, and if the index j exceeds the face frame number J (i.e., j>J), the processing advances to step S1224.

In step S1220, the system control unit 50 refers to the face frame information list recorded in the system memory 52 and determines whether the j-th face frame is the jump target. The face frame information list will be described later with reference to FIGS. 18 and 19. If the j-th face frame is not the jump target, the processing advances to step S1221 in which the index j is incremented. The processing is then returned to step S1219. If the j-th face frame is the jump target, the processing advances to step S1222.

In step S1222, the selected frame is jumped to the j-th face frame. More specifically, the just preceding selected frame is changed to the face frame j, and the range of part of the reproduced image, which has been displayed in an enlarged size just before, is changed to a range determined based on the face frame j. The range determined based on the face frame j is the same as that described above with reference to FIG. 9. At that time, a region including an entire face can be set as the enlargement range based on the face information of the reproduced image.

Figure 17D:
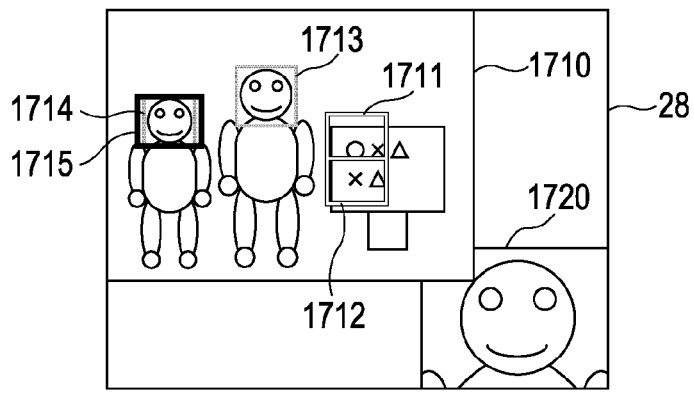

FIG. 17D illustrates a display example in step S1222.

Assuming the index j=2 to be set at the time of step S1222, the image is displayed as illustrated in FIG. 17D at the time of step S1222. A just preceding display is as illustrated in FIG. 17C. Comparing FIGS. 17C and 17D, the partial enlargement frame 1715 in which the face frame 1 (face frame 1713) has been selected and displayed in FIG. 17C is jumped to the face frame 2 (face frame 1714) in FIG. 17D, and the display in the enlarged display region 1720 is also changed in FIG. 17D corresponding to the range indicated by the partial enlargement frame 1715.

In step S1223, the index j of the face frame is incremented to update the face frame display candidate to the next face frame. The processing is then returned to step S1205.

If the index j exceeds the face frame number J in step S1219 (i.e., j>J), the processing advances to step S1224. In step S1224, it is determined whether the index i of the in-focus frame exceeds the in-focus frame number I (i.e., i≦I). If the index i does not exceed the in-focus frame number I (i.e., i≦I), the processing advances to step S1225, and the index i exceeds the in-focus frame number I (i.e., i>I), the processing advances to step S1229.

In step S1225, the system control unit 50 refers to the in-focus frame information list recorded in the system memory 52 and determines whether the i-th in-focus frame is the jump target. The in-focus frame information list will be described later with reference to FIGS. 18 and 19. If the i-th in-focus frame is not the jump target, the processing advances to step S1226 in which the index i is incremented. The processing is then returned to step S1224. If the i-th in-focus frame is the jump target, the processing advances to step S1227.

In step S1227, the selected frame is jumped to the i-th in-focus frame. More specifically, the just preceding selected frame is changed to the in-focus frame i, and the range of part of the reproduced image, which has been displayed in an enlarged size just before, is changed to a range determined based on the in-focus frame i. The range determined based on the in-focus frame i is the same as that described above with reference to FIG. 9. At that time, if the reproduced image is an image captured after execution of the face priority AF, a region including an entire face can be set as the enlargement range based on the in-focus frame.

FIG. 17A illustrates a display example in step S1227.

Assuming the index i=1 to be set at the time of step S1227, the image is displayed as illustrated in FIG. 17A at the time of step S1227. A just preceding display is as illustrated in FIG. 17D. Comparing FIGS. 17D and 17A, the partial enlargement frame 1715 in which the face frame 2 (face frame 1714) has been selected and displayed in FIG. 17D is jumped to the in-focus frame 1 (in-focus frame 1711) in FIG. 17A, and the display in the enlarged display region 1720 is also changed in FIG. 17A corresponding to the range indicated by the partial enlargement frame 1715.

In step S1228, the index i of the in-focus frame is incremented to update the in-focus frame display candidate to the next in-focus frame. The processing is then returned to step S1205.

If the index i of the in-focus frame exceeds the in-focus frame number I in step S1224, this means that a series of processes for selecting each of all the in-focus frames and face frames and displaying the selected frame in an enlarged size have been completed in step S1229. Therefore, after setting both the indexes i and j to 1 and setting the currently selected frame to the in-focus frame in step S1229, the processing is returned to step S1206. In such a manner, the in-focus frames and the face frames can be repeatedly displayed in an enlarged size.

In step S1230, it is determined whether the face button included in the operating units 70 is operated. If the determination result indicates that the face button is operated, the processing advances to step S1231, and if the determination result indicates that the face button is not operated, the processing advances to step S1240.

In step S1231, it is determined whether the face frame number J is 0, i.e., whether the number of detected faces is 0. If J is 0, the processing is returned to step S1205, and if J is not 0, the processing advances to step S1232.

In step S1232, it is determined whether the index j of the next display candidate among the face frames does not exceed the face frame number J. If the index j exceeds J, this means that a series of displaying all the face frames in an enlarged size has been completed. Therefore, the processing advances to step S1236 in which the index j is set to 1. The processing is then returned to step S1231. If the index j does not exceed J, the processing advances to step S1233.

In step S1233, the system control unit 50 refers to the face frame information list recorded in the system memory 52 and determines whether the j-th face frame is the jump target. The face frame information list will be described later with reference to FIGS. 18 and 19. If the j-th face frame is not the jump target, the processing advances to step S1237 in which the index j is incremented. The processing is then returned to step S1232. If the j-th face frame is the jump target, the processing advances to step S1234. Note that because the processing executed herein represents the case where the face button is operated, a jump to the in-focus frame is not performed. Accordingly, there is no fear of double jumps to the same object unlike the case of a jump when the frame button is operated. For that reason, the processing can be modified so as to allow a jump to each of all the face frames without determining in step S1233 whether the relevant face frame is the jump target.

In step S1234, the selected frame is jumped to the j-th face frame. More specifically, the just preceding selected frame is changed to the face frame j, and the range of part of the reproduced image, which has been displayed in an enlarged size just before, is changed to a range determined based on the face frame j. The range determined based on the face frame j is the same as that described above with reference to FIG. 9. At that time, a region including an entire face can be set as the enlargement range based on the face information of the reproduced image. A display in step S1234 is as illustrated in FIG. 17C or 17D.

In step S1235, the index j of the face frame is incremented to update the face frame display candidate to the next face frame. The processing is then returned to step S1205.

In step S1240, it is determined whether the zoom lever included in the operating units 70 is operated. If the zoom lever is operated, the processing advances to step S1241 in which the review mode changing process is executed. The review mode changing process is executed in the same manner as described above with reference to FIG. 8. If the determination result indicates that the zoom lever is not operated, the processing advances to step S1250.

In step S1250, it is determined whether a display change button included in the operating units 70 is operated. If the determination result indicates that the display change button is operated, the focus confirmation display process is brought to an end and the processing advances to step S1251 in which the normal display process is executed. In the normal display process, the system control unit 50 displays only the captured image stored in the memory 32 on the image display unit 28 through the memory control unit 15. Further, the system control unit 50 updates the current display mode, which is temporarily stored in the system memory 52, to the normal display. After changing to the normal display, the system control unit 50 is returned to the reproducing input waiting process of FIG. 10. If the determination result in step S1250 indicates that the display change button is not operated, the processing advances to step S1260.

In step S1260, it is determined whether another operation input is detected. If there is another operation input, the processing advances to step S1261 in which a process corresponding to the operation input is executed. If there is no other operation input, the processing is returned to step S1205.

FIGS. 17A to 17D illustrate display examples on the image display unit 28 in the during-reproducing focus confirmation process of FIG. 12. The image display unit 28 displays an entire display region 1710 for the reproduced image, an enlarged display region 1720 providing a display region of a partial enlargement frame 1715, an in-focus frame 1711 (in-focus frame 1), an in-focus frame 1712 (in-focus frame 2), a face frame 1713 (face frame 1), a face frame 1714 (face frame 2).

In FIG. 17A, the in-focus frame 1711 (in-focus frame 1) is displayed in an enlarged size. In FIG. 17B, the in-focus frame 1712 (in-focus frame 2) is displayed in an enlarged size. In FIG. 17C, the face frame 1713 (face frame 1) is displayed in an enlarged size. In FIG. 17D, the face frame 1714 (face frame 2) is displayed in an enlarged size.

In the case where the initially selected frame determined in step S1205 is the in-focus frame in the during-reproducing focus confirmation process of FIG. 12, when the frame jump button is repeatedly pressed, the screen is changed in the order of FIG. 17A→FIG. 17B→FIG. 17C→FIG. 17D→FIG. 17A, and so on. Thus, the in-focus frames are first partially enlarged one by one. After jumping to each of the in-focus frames, a partial enlarged display of each of the face frames is started.

To the contrary, in the case where the initially selected frame determined in step S1205 is the face frame, when the frame jump button is repeatedly pressed, the screen is changed in the order of FIG. 17C→FIG. 17D→FIG. 17A→FIG. 17B→FIG. 17C, and so on. Thus, the face frames are first partially enlarged one by one. After jumping to each of the face frames, a partial enlarged display of each of the in-focus frames is started.

In the flowchart of FIG. 12, after displaying the in-focus frame in an enlarged size by pressing the frame jump button, when the face button is pressed to display the face frame in an enlarged size and the frame jump button is pressed again to make a jump to the in-focus frame, the next in-focus frame subsequent to the in-focus frame, which has been displayed in an enlarged size just before, is displayed in an enlarged size. However, the processing is not limited to the above-described example. As another example, the index i can be controlled for return to display the first in-focus frame, or for return to display the in-focus frame that has been displayed just before.

Also, the information for the preceding display can be temporarily stored in, e.g., the system memory 52 such that when the operation is performed to exit the focus confirmation mode after pressing the frame jump button to jump the partial enlargement frame to a different frame and then to enter the focus confirmation mode again, the frame which has been previously displayed in an enlarged size can be displayed in an enlarged size again.

Further, for the in-focus frame which has been made in focus by the face priority AF mode, it can be set to be treated similarly to the face frame such that a jump to the relevant in-focus frame is performed by pressing the face button. As an alternative, that in-focus frame can be given higher priority than the other in-focus frames and the face frames to be displayed in an enlarged size with top priority.

If there is an operating member dedicated for the in-focus frame, the processing can be modified so as to perform a jump to each of only the in-focus frames similarly to the case of the face button in FIG. 12.

Additionally, even when the face button is not provided, a method of displaying the face recognition information during reproducing with priority can also be practiced by assuming the in-focus frame number I to be 0, thus allowing a jump to only the human face frame.

(Face Confirmation)

Figure 13:
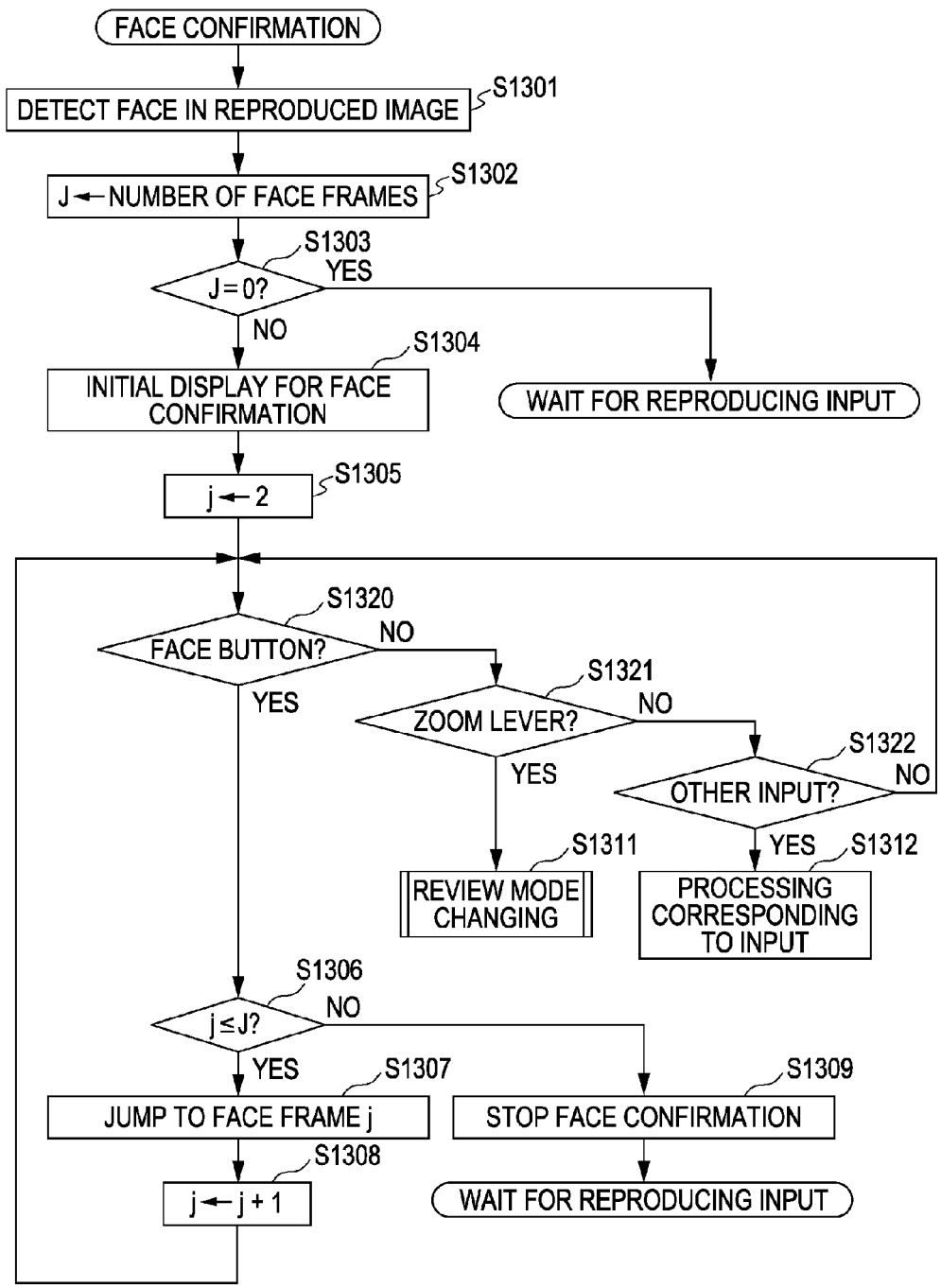
FIG. 13 is a flowchart illustrating a face confirmation process in the exemplary embodiment of the present invention.

FIG. 13 is a flowchart illustrating the face confirmation process in step S1027 of FIG. 10.

The system control unit 50 executes the face detection process on the captured image which is stored in the memory 32 and which is now under reproducing (step S1301). The face detection process is executed as illustrated in FIG. 4.

The total number of faces detected in step S1301 is assumed to be the face frame number J (step S1302). At that time, it is also assumed that a number J of face frames are sequenced in the order of a face frame 1>a face frame 2> . . . >a face frame J. An index for the sequencing can be selected, for example, such that the face frames are sequenced in the descending order of size and nearness to the center. Of course, the index for the sequencing is not limited to such an example.

In step S1303, the system control unit 50 determines whether J is 0. If J is 0, i.e., if no faces are detected from the reproduced image in step S1301, the system control unit 50 is returned to the reproducing input waiting process of FIG. 10 (step S1001).

If J is not 0, the processing advances to step S1304 in which the system control unit 50 executes an initial display for the face confirmation on the image display unit 28 through the memory control unit 15. The initial display includes not only an entire display and a partial enlarged display of the captured image that is stored in the memory 32, but also the number J of face frames. The in-focus frames are not displayed.

Comparing with the display examples (FIGS. 17A to 17D) in the during-reproducing focus confirmation process of FIG. 12, the in-focus frames 1711 and 1712 are not displayed. Thus, a jump to the in-focus frame cannot be performed. In other words, by providing the partial enlarged display of only a portion of the entire captured image which corresponds to each of the face frames, the focus confirmation can be performed successively only on the face portions.

In step S1305, an index representing the face frame to be displayed in an enlarged size is initialized. More specifically, "j" is an index representing a next candidate for enlarged display among the face frames. The index is initialized to 1 in step S1305.

If the index j of the next display candidate among the face frames exceeds the face frame number J in step S1306, this means that a series of displaying all the face frames in an enlarged size has been completed. Therefore, the system control unit 50 returns the display on the image display unit 28 to the display before the face confirmation process through the memory control unit 15 (step S1309). At that time, after referring to the display mode temporarily stored in the system memory 52 and updating the display, the system control unit 50 is returned to the reproducing input waiting process of FIG. 10 (step S1001). In the face confirmation, the confirmation process using the partial enlarged display is brought to an end at the time when a series of displaying all the face frames in an enlarged size has been completed.

As a result of determining in step S1306 whether the index j of the next display candidate among the face frames does not exceed the face frame number, if j does not exceed J, the j-th face frame is set to be displayed in the partial enlarged display region (S1307), and the processing advances to S1308. At that time, the partial enlarged display frame indicating the position, which corresponds to the partial enlarged display region in the entire display, is also displayed. In step S1308, the index j is incremented and the face frame display candidate is updated to the next face frame.

In step S1310, the system control unit 50 checks the presence of an operation input from the user. If there is no input, the system control unit 50 waits for coming-in of an input. If any operation input is detected, the system control unit 50 identifies the operation input. If the operation input is from the face button included in the operating units 70, the processing is returned to step S1306.

If the operation input is from the zoom lever included in the operating units 70 (step S1310), the review mode changing process (step S1311) is executed. The processing illustrated in FIG. 8 is executed in the review mode changing process.

If the operation input is another input (step S1310), the processing corresponding to the operation input is executed (step S1312). Herein, a jump to the in-focus frame by the frame jump button and the display changing process by the display change button are not executed.

Figure 23A:
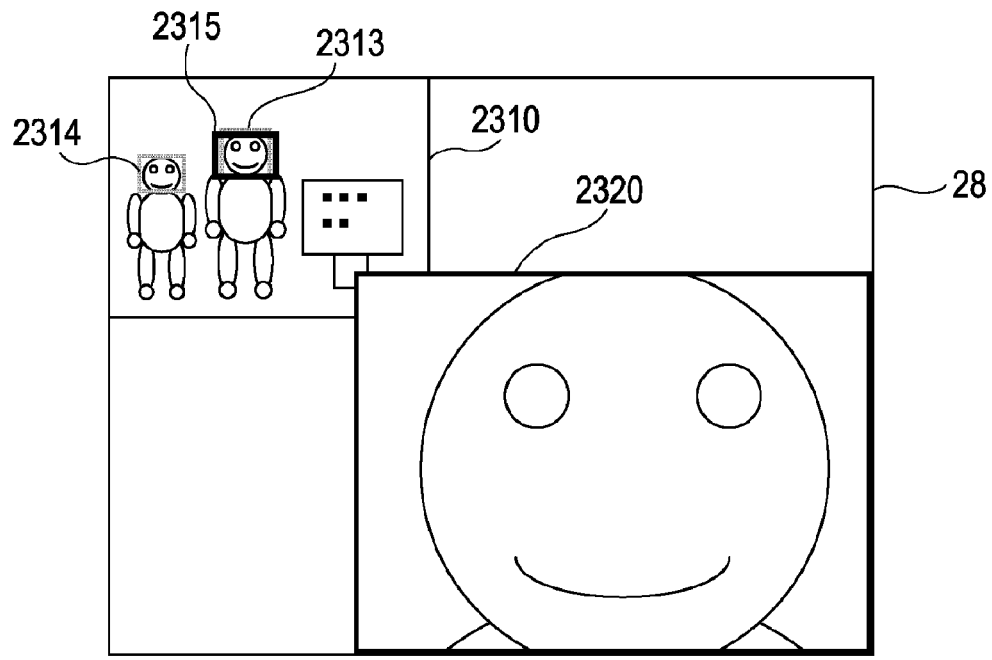
FIGS. 23A and 23B illustrate display examples of a face confirmation process in the exemplary embodiment of the present invention.
Figure 23B:
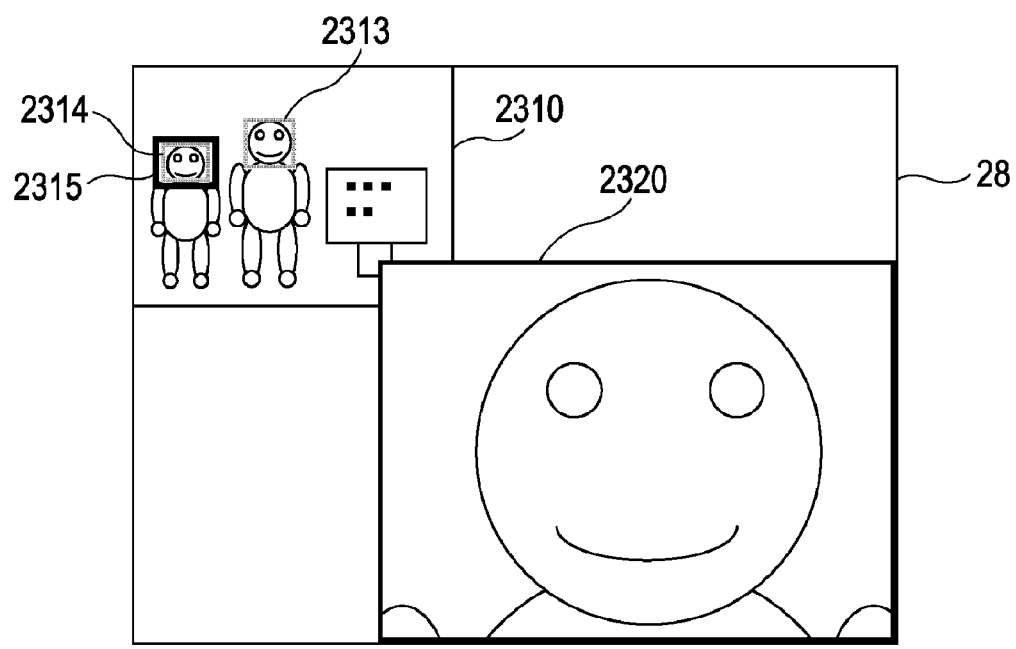

FIGS. 23A and 23B illustrate display examples provided on the image display unit 28 during the face confirmation process of FIG. 13.

The image display unit 28 displays an entire display region 2310 of the reproduced image, an enlarged display region 2320 representing a region of a partial enlargement frame 2315, a face frame 2313, and a face frame 2314. In-focus frames are not displayed.

Also, in an initial state, the enlarged display region 2320 is displayed in a larger size than the entire display region 2310. In FIG. 23A, the face frame 2313 is displayed in an enlarged size. In FIG. 23B, the face frame 2314 is displayed in an enlarged size.

When the face button is repeatedly pressed in the face confirmation process of FIG. 13, the screen is changed in the order of FIG. 23A→FIG. 23B→end of the face confirmation process.

(Determination and Display of Initially Selected Frame)

Figure 16A:
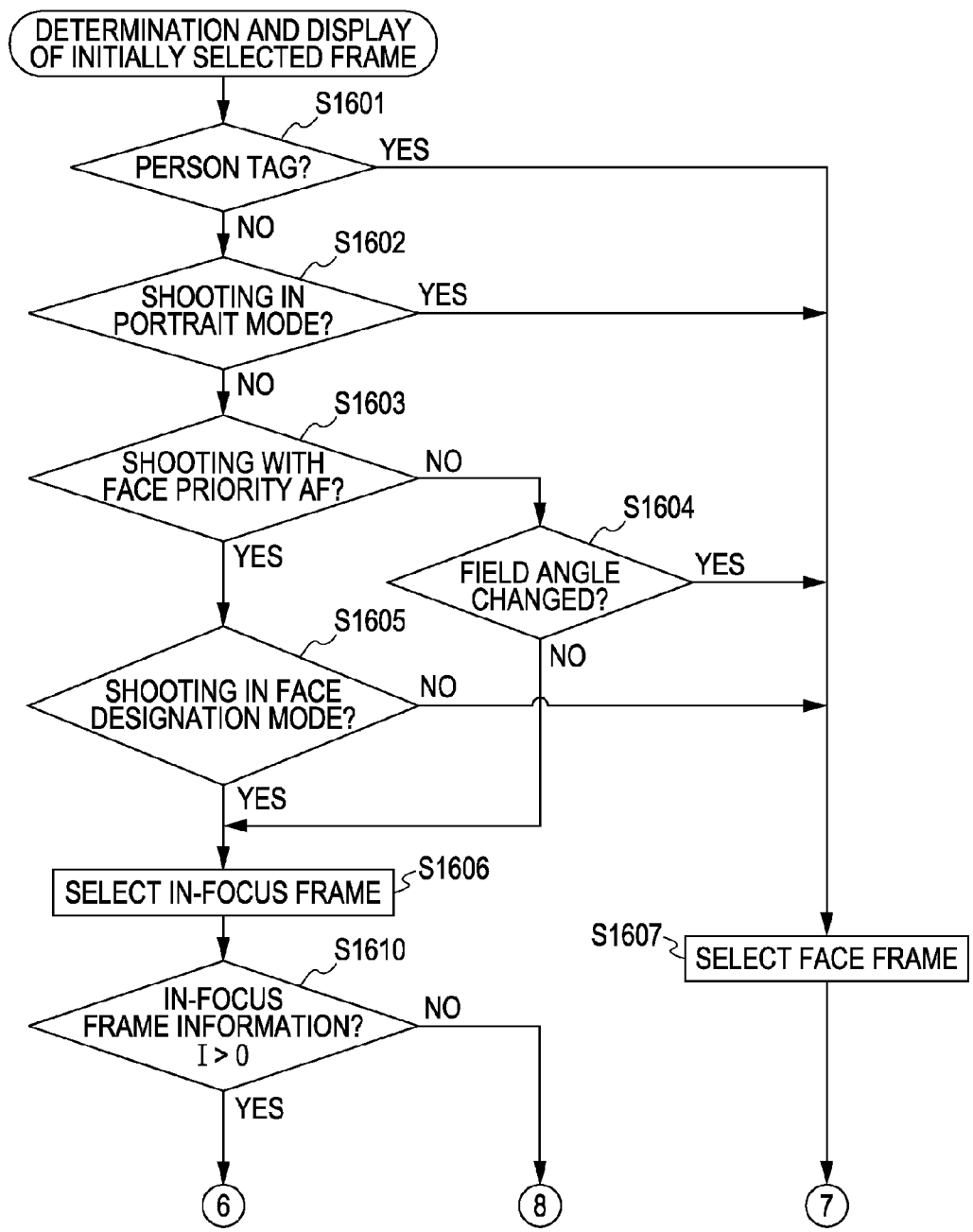
FIGS. 16A and 16B are flowcharts illustrating an initially-selected-frame determination and display process in the exemplary embodiment of the present invention.
Figure 16B:
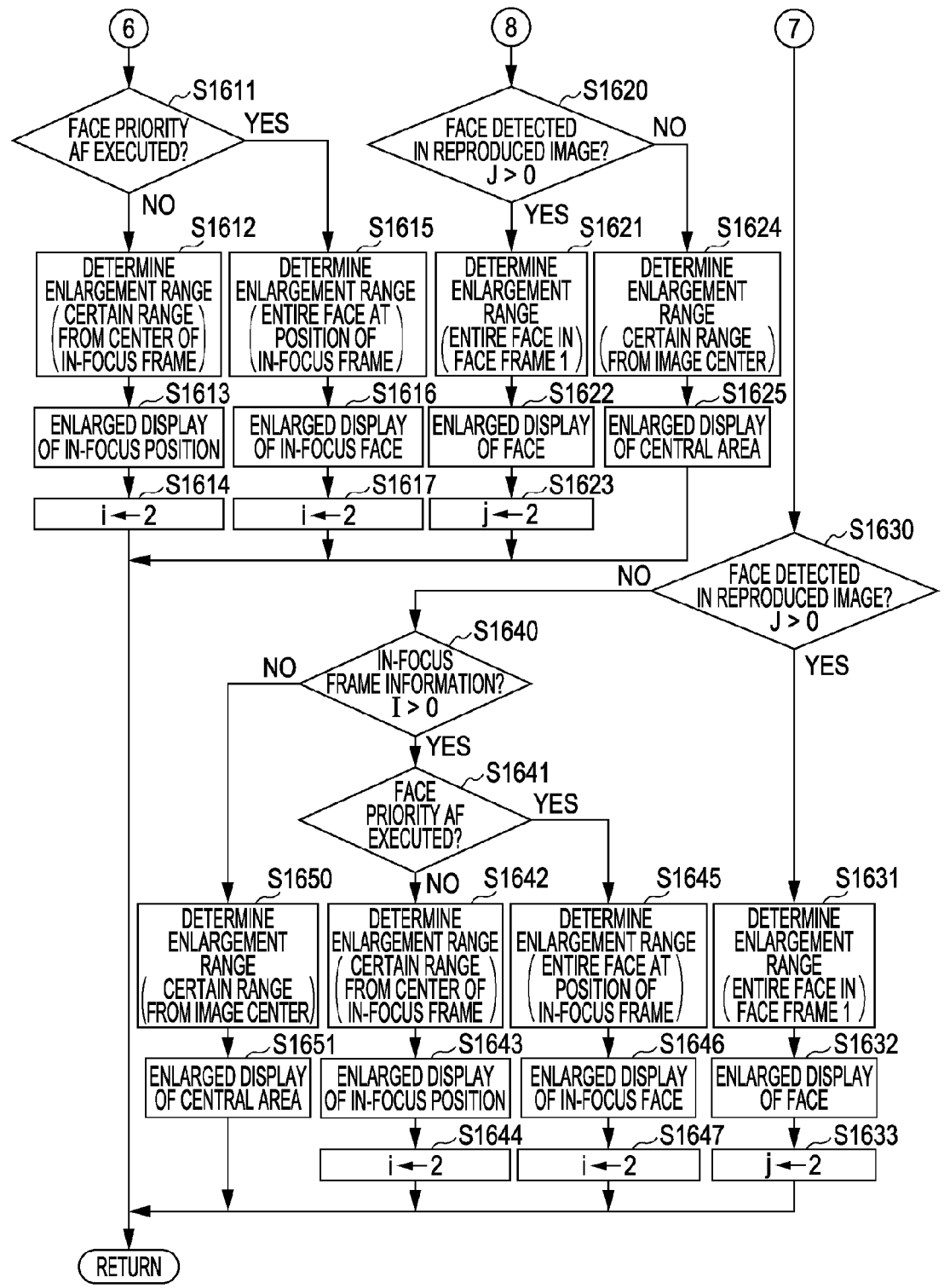

FIG. 16 is a flowchart illustrating the initially-selected-frame determination and display process in step S1204 of FIG. 12.

First, in step S1601, the system control unit 50 refers to the classification information added to the image under reproducing and determines whether a person tag, i.e., the classification information indicating that a person is captured in the image, is attached. If the person tag is attached, the processing advances to step S1607 in which the face frame is set as the initially selected frame with priority. The reason why the face frame is set as the initially selected frame with priority resides in that, when the person tag is attached, a main object is a person with a high probability. If the person tag is not attached, the processing advances to step S1602.

Then, in step S1602, the system control unit 50 refers to the shooting mode at the time of shooting, which is added to the image under reproducing, and determines whether the shooting mode is the portrait mode. If the shooting mode is the portrait mode, the processing advances to step S1607 in which the face frame is set as the initially selected frame with priority. The reason why the face frame is set as the initially selected frame with priority resides in that, when an image is captured in the portrait mode, a main object is a person with a high probability. A similar determination can also be performed in the other shooting mode in which the object is expected to be a person, besides the portrait mode. If the determination result indicates that the reproduced image is not captured in the portrait mode, the processing advances to step S1603.

In step S1603, the system control unit 50 refers to the setting information at the time of shooting, which is added to the image under reproducing, and determines whether the image under reproducing is an image captured after execution of the face priority AF. If the image under reproducing is an image captured after execution of the face priority AF, the processing advances to step S1605. If the reproduced image is not an image captured after execution of the face priority AF, the processing advances to step S1604.

In step S1604, the system control unit 50 determines whether the field angle is changed between during the AF and during the shooting. A change of the field angle can be detected by utilizing an output of an acceleration sensor or an angular speed sensor, or by employing coordinate information of, e.g., the in-focus frame that is added to the image, and the color, brightness, etc. of the image. If the change of the field angle is determined in step S1604, the processing advances to S1607 in which the face frame is set as the initially selected frame with priority. Even in the case of the AF being executed in the mode other than the face priority AF, when the field angle is changed during a period up to the shooting, a human face is given priority in consideration of a possibility that the in-focus frame is not displayed at the position actually set by the AF, or that the shooting is made at a field angle changed after focusing on the person. If no change of the field angle between during the AF and during the shooting is determined in step S1604, the processing advances to S1606 in which the in-focus frame is given priority. The reason why the in-focus frame is given priority resides in that, when the focus adjustment is performed in the mode other than the face priority AF, the user has shot an image by intentionally designating the in-focus frame with a high probability, or that a portion actually made in focus can be correctly displayed because of no change of the field angle.

In step S1605, the system control unit 50 refers to the setting information at the time of shooting, which is added to the image under reproducing, and determines whether the image under reproducing is an image captured in a face designation mode. The face designation mode is a special mode of the face priority AF in which the AF is executed while tracking a specific face designated by the user. If the designation result indicates that the reproduced image is not captured in the face designation mode, the processing advances to step S1607 in which the face frame is set as a preferentially selected frame. On the other hand, if the designation result indicates that the reproduced image is captured in the face designation mode, the processing advances to step S1606 in which the in-focus frame is set as the preferentially selected frame. In the face designation mode, the user can select an arbitrary face as an in-focus target and can adjust a focus on, e.g., even a small face located at a screen end, as a main object. Therefore, even in the case of a large face being displayed near a screen center, if the user designates the small face located at the screen end in the face designation mode, the image is assumed such that it has been captured by the user paying main attention to the small face. However, when the face frame is selected as the initially displayed frame, the face frame 1, i.e., the face having a larger size and located nearer to the screen center, is selected and the face differing from the desired object is displayed in an enlarged size. In view of such a problem, for the image which has been captured after execution of the face priority AF, but which has been captured with some face designated in the face designation mode, the in-focus frame is set as the initially selected frame with higher priority than the face frame.

In step S1606, the in-focus frame is determined to be preferentially set as the initially selected frame and is temporarily stored in, e.g., the system memory 52 so that the determination result can be referred to in processing of a subsequent step. On the other hand, in step S1607, the face frame is determined to be preferentially set as the initially selected frame and is also temporarily stored in, e.g., the system memory 52 so that the determination result can be referred to in processing of a subsequent step.

In step S1610, the system control unit 50 determines whether the in-focus frame number I is larger than 0, i.e., whether there is an in-focus place in the image. If the presence of the in-focus place (i.e., the in-focus frame number I>0) is determined, the processing advances to step S1611, and if the absence of the in-focus place is determined, the processing advances to step S1620.

In step S1611, the system control unit 50 determines whether the image under reproducing is an image captured after execution of the face priority AF. If it is determined that the face priority AF has not been executed, the processing advances to step S1612, and if it is determined that the face priority AF has been executed, the processing advances to step S1615.

In step S1612, the initially selected frame is set to the in-focus frame and an enlargement range to be enlarged in the image under reproducing is determined. Herein, the enlargement range is determined as a range having a size at a certain proportion with respect to the size of the entire image under reproducing about the center of the in-focus frame. When there are plural in-focus frames, the enlargement range is determined for the in-focus frame 1 at the highest rank in accordance with the sequencing set in step S1202 of FIG. 12. In addition to the above-described example, the enlargement range can also be provided as, e.g., a range that is optionally set by the user in advance, or a range falling within the enlarged display region about the center of the in-focus frame with a pixel magnification of 100%.

In step S1613, the enlargement range in the image under reproducing, which has been determined in step S1612, is displayed, along with the entire image, in an enlarged size so as to fall within the enlarged display region. A display presented here is substantially the same as that described above with reference to FIG. 15A and a detailed description of the display is not repeated. However, differences reside in that the timing of the face detection process for obtaining the face frame to be displayed is in step S1201 of FIG. 12, i.e., during the image reproducing, and that the result of the calculation of the region correlation in step S1202 of FIG. 12 is reflected. Those points will be described later with reference to FIGS. 19 and 20.

In step S1614, the index i having been initialized in step S1203 of FIG. 12 is incremented to update the in-focus frame display candidate to the next in-focus frame. The initially-selected-frame determination and display process is then brought to an end.

In step S1615, the initially selected frame is set to the in-focus frame and a range encompassing the entirety of a face included in the in-focus frame 1 is determined as the enlargement range to be enlarged in the image under reproducing. Herein, because the in-focus frame is set as the initially selected frame with priority, a range obtained by enlarging or reducing the in-focus frame 1 is set as the enlargement range instead of the range obtained by enlarging or reducing the region of a face detected by the face detection process during reproducing. As described above with reference to FIG. 15C, the size of the in-focus frame in the image captured after execution of the face priority AF is determined based on the region of a face detected during the shooting. Therefore, the range encompassing the entirety of the face included in the in-focus frame can be determined by enlarging or reducing the range of the in-focus frame obtained with the face priority AF at a particular value depending on the algorithm for the face detection.

In step S1616, the range encompassing the entirety of the face included in the in-focus frame 1, which is contained in the image under reproducing and has been determined in step S1615, is displayed, along with the entire image, in an enlarged or reduced size so as to fall within the enlarged display region. A display presented here is substantially the same as that described above with reference to FIG. 15B and a detailed description of the display is not repeated. However, differences reside in that the timing of the face detection process for obtaining the face frame to be displayed is in step S1201 of FIG. 12, i.e., during the image reproducing, and that the result of the calculation of the region correlation in step S1202 of FIG. 12 is reflected. Those points will be described later with reference to FIGS. 19 and 20.

In step S1617, the index i having been initialized in step S1203 of FIG. 12 is incremented to update the in-focus frame display candidate to the next in-focus frame. The initially-selected-frame determination and display process is then brought to an end.

In step S1620, the system control unit 50 determines whether the face frame number J, which has been detected during reproducing and obtained in step S1202 of FIG. 12, is larger than 0, i.e., whether there is a face in the image. If the presence of the face (i.e., the face frame number J>0) is determined, the processing advances to step S1621, and if the absence of the face is determined, the processing advances to step S1624.

In step S1621, the face frame is determined as the initially selected frame, and a range obtained by enlarging or reducing the face region represented by the face information regarding the face frame 1, which has been set in step S1202 of FIG. 12, is determined as the enlargement range. A method of determining the enlargement range by enlarging or reducing the face region represented by the face information during reproducing is as per described above with reference to FIG. 15C.

In step S1622, face frames representing the face frames 1-J detected during reproducing and the enlargement range determined in step S1621 as the partial enlargement frame are displayed in a superimposed relation to the entire display region. Further, the region indicated by the partial enlargement frame is displayed, along with the entire image, in an enlarged or reduced size at such a magnification as to fall within the enlarged display region.

In step S1623, the index j initialized in step S1203 of FIG. 12 is incremented to update the face frame display candidate to the next face frame.

In step S1624, because neither the in-focus frame nor the face frame is present, the initially selected frame is not determined and a range having a size at a certain proportion with respect to the size of the entire image about the image center is determined as the enlargement range.

In step S1625, the enlargement range determined in step S1624 is displayed as the partial enlargement frame in a superimposed relation to the entire display region. Further, the region indicated by the partial enlargement frame is displayed, along with the entire image, in an enlarged or reduced size at such a magnification as to fall within the enlarged display region. In this case, because neither the in-focus frame nor the face frame is present, only the partial enlargement frame is displayed in a superimposed relation to the entire display region.

In step S1630, the system control unit 50 determines whether the face frame number J, which has been detected during reproducing and obtained in step S1202 of FIG. 12, is larger than 0, i.e., whether there is a face in the image. If the presence of the face (i.e., the face frame number J>0) is determined, the processing advances to step S1631, and if the absence of the face is determined, the processing advances to step S1640. Herein, because the face frame is given priority as the initially selected frame in step S1607, whether a face is present is first determined unlike the case where the in-focus frame is given priority as the initially selected frame in step S1606. In subsequent processing, therefore, if the face is present, the face frame indicating the face detected during reproducing is displayed in an enlarged size with higher priority than the in-focus frame.

Since processes in steps S1631, S1632, and S1633 are similar to the above-described processes in steps S1621, S1622 and S1623, respectively, a detailed description of those steps is not repeated here.

In step S1640, the system control unit 50 determines whether the in-focus frame number I is larger than 0, i.e., whether there is an in-focus place in the image. If the presence of the in-focus place (i.e., the in-focus frame number I>0) is determined, the processing advances to step S1641, and if the absence of the in-focus place is determined, the processing advances to step S1650.

Since processes in steps S1641, S1642, S1643 and S1644 are similar to the above-described processes in steps S1611, S1612, S1613 and S1614, respectively, a detailed description of those steps is not repeated here. Also, since processes in steps S1650 and S1651 are similar to the above-described processes in steps S1624 and S1625, respectively, a detailed description of those steps is not repeated here.

If it is determined in step S1641 that the reproduced image is an image captured after execution of the face priority AF, the processing advances to step S1645. Since processes in steps S1645, S1646, and S1647 are similar to the above-described processes in steps S1615, S1616 and S1617, respectively, a detailed description of those steps is not repeated here. Additionally, in step S1645, the range obtained by enlarging or reducing the in-focus frame 1 is determined as the enlargement range as in step S1615. However, the reason differs from the case of step S1615. Namely, the reason resides in that the absence of the face from the image is determined in the face detection during reproducing.

While the enlargement range is determined in this exemplary embodiment after determining in steps S1611 and S1641 whether the image has been captured after execution of the face priority AF, some other method can also be used so long as it can determine, as the enlargement range, a range confirmable as being particularly specified for the object to which the photographer has paid attention at the time of shooting. For example, when an image can be confirmed as being one where the exposure control, the white balance control, the light control, etc. are executed instead of the face priority AF on an object which is not limited to a face and has been detected at the time of shooting, such an image is presumably captured by the photographer paying attention to the detected object. In that case, a range including the entirety of the object having been subjected to the exposure control, the white balance control, the light control, etc. can also be determined as the enlargement range. An example of the object detectable at the time of shooting is a red eye.

Further, the determination in step S1620 is not limited to the determination regarding the presence of a face. The enlargement range can also be set by determining whether other object, e.g., a red eye, than a face is detected, and by selecting a region including the entirety of the detected object in accordance with the determination. In addition, the determination in step S1630 can also be made such that, if the frame given priority as the initially selected frame is a frame indicating an object other than a face and the object indicated by the frame can be detected, a range including the entirety of such an object can be set as the enlargement range.

(Calculation of Region Correlation)

FIG. 18 is a flowchart illustrating the region correlation calculation process in step S1202 of FIG. 12.

First, in step S1801, the system control unit 50 obtains the in-focus frame information that is obtained by referring to the added information of the image under reproducing.

Then, in step S1802, the system control unit 50 refers to the system memory 52 and obtains during-reproducing face frame information, including a total number of detected faces and respective regions of the faces, based on the face information detected by the face detection during reproducing in step S1201 of FIG. 12.

In step S1803, the total number of in-focus frames obtained in step S1801 is set to an in-focus frame number I and the total number of face frames obtained in step S1802 are set to a face frame number J. It is here assumed that a number I of in-focus frames and a number J of face frames are sequenced respectively in the order of an in-focus frame 1>an in-focus frame 2>...>an in-focus frame I and a face frame 1>a face frame 2>...>a face frame J. An index for the sequencing can be selected, for example, such that the in-focus frames are sequenced in the descending order of an AF evaluation value, and that the face frames are sequenced in the descending order of size and nearness to the center. Of course, the index for the sequencing is not limited to such an example.

Then, in step S1804, the system control unit 50 calculates center coordinates of the region of each face obtained in step S1802 and temporarily stores the calculated center coordinates in the system memory 52.

In step S1805, the system control unit 50 calculates respective ranges of the in-focus frames obtained in step S1801 and temporarily stores the calculated ranges in the system memory 52.

In step S1806, indexes for the in-focus frame number and the face frame number are initialized. More specifically, "i" is an index representing the in-focus frame, and "j" is an index representing the face frame. Those indexes are both initialized to 0 in step S1806.

In step S1807, the system control unit 50 determines whether the in-focus frame number I and the face frame number J set in step S1803 are each 0, i.e., whether the in-focus frame and the face frame are both present. If the presence of both the in-focus frame and the face frame is determined, the processing advances to step S1808, and if one of the in-focus frame and the face frame is not present (i.e., I=0 or J=0), the region correlation calculation process is brought to an end.

In step S1808, the index i of the in-focus frame is incremented.

In step S1809, the index j of the face frame is incremented.

In step S1810, the correlation between the in-focus frame and the face frame is determined. Herein, the correlation between the in-focus frame and the face frame is determined based on the distance between the in-focus frame and the face frame in the image. More specifically, in this exemplary embodiment, the system control unit 50 refers to the system memory 52 and determines whether the distance between the in-focus frame and the face frame is larger than a predetermined value, by determining whether the center coordinates of the region of each face obtained in step S1804 is located within the range of each in-focus frame obtained in step S1805. Of course, a method of determining the distance between the in-focus frame and the face frame is not limited to such an example. The determination can also be made, for example, based on the distance between respective center coordinates of the in-focus frame and the face frame, or based on an overlapping rate between respective ranges of the in-focus frame and the face frame. Additionally, if the center coordinates of the region of some face is located within the range of some in-focus frame, this means that the region of the face is overlapped with the range of the in-focus frame at a certain rate. In other words, the determination as to whether the center coordinates of the region of some face is located within the range of some in-focus frame represents the determination as to an overlapping rate between the in-focus frame and the face frame. If the distance between the in-focus frame and the face frame can be determined to be short, i.e., if the center coordinates of the face are located within the in-focus frame, the face frame of the relevant face and the relevant in-focus frame are determined to have correlation, and the processing advances to step S1811. If the center coordinates of the face are not located within the in-focus frame, the face frame of the relevant face and the relevant in-focus frame are determined to have no correlation, and the processing advances to step S1812.

In step S1811, the in-focus frame information list or the during-reproducing face frame information list is updated for the face frame and the in-focus frame which have been determined to have correlation in step S1810. Those lists, described later with reference to FIG. 19, are assumed to be recorded in the system memory 52.

In step S1812, it is determined whether the index j of the face frame reaches the total face frame number J (i.e., j=J). If the index j of the face frame does not reach the total face frame number J, the index j of the face frame is incremented in step S1809 to determine correlation between the next face frame and each of all the in-focus frames. If the index j of the face frame reaches the total face frame number J (i.e., j=J), the processing advances to step S1813.

In step S1813, the index j of the face frame is initialized to 0.

In step S1814, it is determined whether the index i of the in-focus frame reaches the total in-focus frame number I (i.e., i=I). If the index i of the in-focus frame does not reach the total in-focus frame number I, the index i of the in-focus frame is incremented in step S1808 to compare the next in-focus frame with each of all the face frames, thereby determining correlation between them. If the index i of the in-focus frame reaches the total in-focus frame number I, this means that correlation has been determined for combinations between all the in-focus frames and all the face frames. Therefore, the region correlation calculation process is brought to an end.

Figures 19A, 19B, 19C:
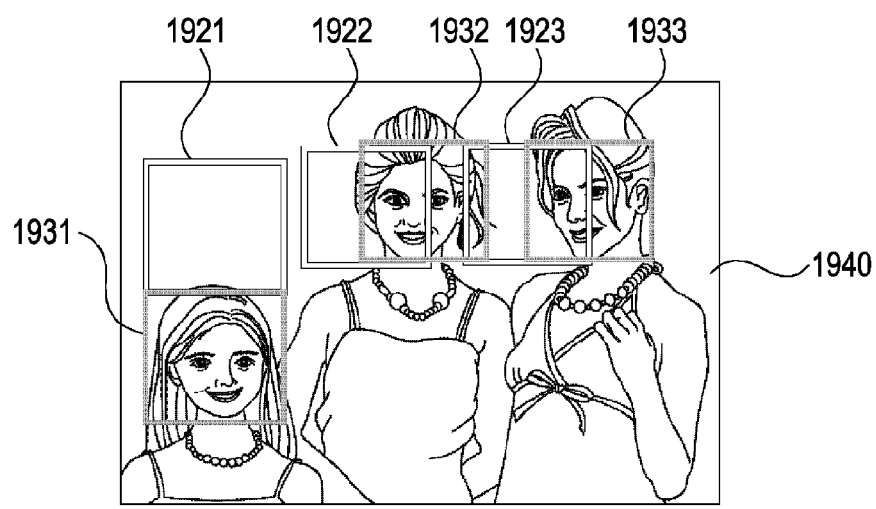
FIG. 19A is a table illustrating an example of an in-focus frame information list in the exemplary embodiment of the present invention.
FIG. 19B is a table illustrating an example of a during-reproducing face frame information list in the exemplary embodiment of the present invention.
FIG. 19C illustrates an example of an image according to the in-focus frame information list and the during-reproducing face frame information list in the exemplary embodiment of the present invention.

FIGS. 19A and 19B illustrate examples of the in-focus frame information list and the during-reproducing face frame information list both recorded in the system memory 52.

It is assumed that an image 1940 of FIG. 19C is an image captured after execution of the face priority AF, and in-focus frames 1921, 1922 and 1923 are present in the image 1940. Also, in accordance with the sequencing in step S1803, the in-focus frames 1921, 1922 and 1923 are assumed to be sequenced in the order of the in-focus frame 1, the in-focus frame 2, and the in-focus frame 3, respectively. In this exemplary embodiment, as described above with reference to FIGS. 1 and 3, the distance measurement and the photometry are performed in response to the first shutter switch signal SW1, and the actual exposure and shooting are performed in response to the second shutter switch signal SW2. Therefore, when the photographer has moved the digital camera 100 or the object has moved in itself during a period from the determination of the in-focus frame in response to the first shutter switch signal SW1 to the input of the second shutter switch signal SW2, the in-focus frame is shifted from the object on which the focus adjustment has been actually performed. Thus, in the image 1940, each in-focus frame is shifted from the object (face) on which the face priority AF has been actually executed. By executing the face detection in step S1201 of FIG. 12 on the image 1940, faces captured in the image 1940 are detected and face frames 1931, 1932 and 1933 are obtained. In accordance with the sequencing in step S1803, the face frames 1931, 1932 and 1933 are assumed to be sequenced in the order of the face frame 1, the face frame 2, and the face frame 3, respectively.

FIG. 19A illustrates an example of the in-focus frame information list prepared, for example, regarding the image 1940 illustrated in FIG. 19C. The in-focus frame information list is made up of;

index 1901 of each in-focus frame, central position 1902 of each in-focus frame, other in-focus frame information 1903 including the size and range of each in-focus frame, jump target information 1904 indicating whether each in-focus frame is a jump target, and display target information 1905 indicating whether each in-focus frame is a frame to be displayed.

FIG. 19B illustrates an example of the during-reproducing face frame information list prepared, for example, regarding the image 1940 illustrated in FIG. 19C. The during-reproducing face frame information list is made up of;

index 1911 of each face frame, central position 1912 of each face frame, other face frame information 1913 including the size and range of each face frame, jump target information 1914 indicating whether each face frame is a jump target, and display target information 1915 indicating whether each face frame is a frame to be displayed.

In this exemplary embodiment, if it is determined that there is correlation between the in-focus frame and the face frame, the jump target information 1914 and the display target information 1915 in the during-reproducing face frame information list are updated to remove the face frame, which has been determined to have the correlation, from the display target and the jump target, the latter being described above with reference to FIG. 12, etc. In other words, the in-focus frame and the face frame, which have been determined to have the correlation therebetween, are regarded as frames representing substantially the same object, and one of them is neither set as the jump target, nor displayed. This is effective in omitting the step of jumping to the same object twice, and in avoiding such a complicated view that two types of frames substantially identical to each other are displayed. In the image 1940 of FIG. 19C, a pair of the in-focus frame 1922 and the face frame 1932 and a pair of the in-focus frame 1923 and the face frame 1933 are determined to be positioned close to each other and to have the correlation. Therefore, the face frame 1932 (face frame 2) and the face frame 1933 (face frame 3) are removed from the jump target and the display target.

Figure 20:
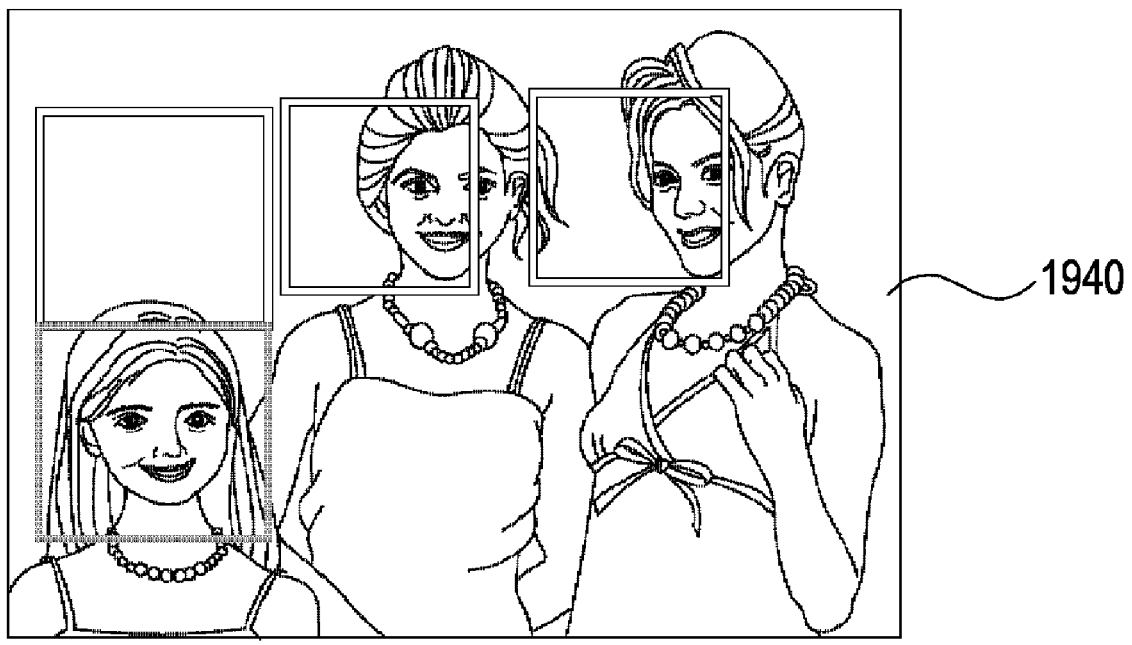
FIG. 20 illustrates a first display example reflecting the in-focus frame information list and the during-reproducing face frame information list in the exemplary embodiment of the present invention.

FIG. 20 illustrates an example in which the image 1940, the in-focus frames, and the face frame are displayed based on the in-focus frame information list and the during-reproducing face frame information list both updated as described above. In FIG. 20, the face frame 2 and the face frame 3 are not displayed as a result of reflecting the display target information 1915 in the during-reproducing face frame information list. Comparing with FIG. 19C in which all the in-focus frames and the face frames are displayed, unnecessary frames are not displayed and a simplified frame display is realized. Further, because the face frame 2 and the face frame 3 are removed from the jump target as well, the number of jumps can be reduced and confirmation of the in-focus position and the face can be performed more efficiently.

In this exemplary embodiment, for the in-focus frame and the face frame which have been determined to have correlation, the face frame is removed from the jump target and the display target so that the in-focus frame is confirmed with priority. As an alternative, priority in confirmation can be given to the face frame. By displaying the face frame with priority which has been detected from the reproduced image in step S1201 of FIG. 12, the user can also efficiently confirm, e.g., the expression of a person detected from the image under reproducing. In such a case, if it is determined in step S1810 of FIG. 18 that there is correlation between the in-focus frame and the face frame, the jump target information 1904 and the display target information 1905 in the in-focus frame information list are updated.

Whether to confirm the in-focus frame or the face frame with priority when the presence of correlation is determined, can be optionally set by the user in advance or can be automatically set by the digital camera 100 depending on cases. For example, in the case of an image that is captured after execution of the face priority AF during the shooting, this can be regarded as indicating that the shooting is performed with the user paying primary attention to a person. Therefore, the setting can be made such that the digital camera 100 automatically confirms the face frame with priority. Also, in the case of an image that is captured after executing the AF at one central point during the shooting, this can be regarded as indicating that the photographer has shot the image while paying attention to an object represented in the in-focus frame, or that the user's intention is strongly reflected on the in-focus frame. Therefore, the setting can be made such that the digital camera 100 automatically confirms the in-focus frame with priority.

While the face frame 2 and the face frame 3 both correlated with the in-focus frames are not displayed in FIG. 20, they can be removed only from the jump target by changing just the color/shape of each of the face frames instead of not displaying them. With such a modification, the number of jumps is reduced while allowing the user to confirm the positions of the face frames, thus resulting in more precise and efficient confirmation.

Figure 21A:
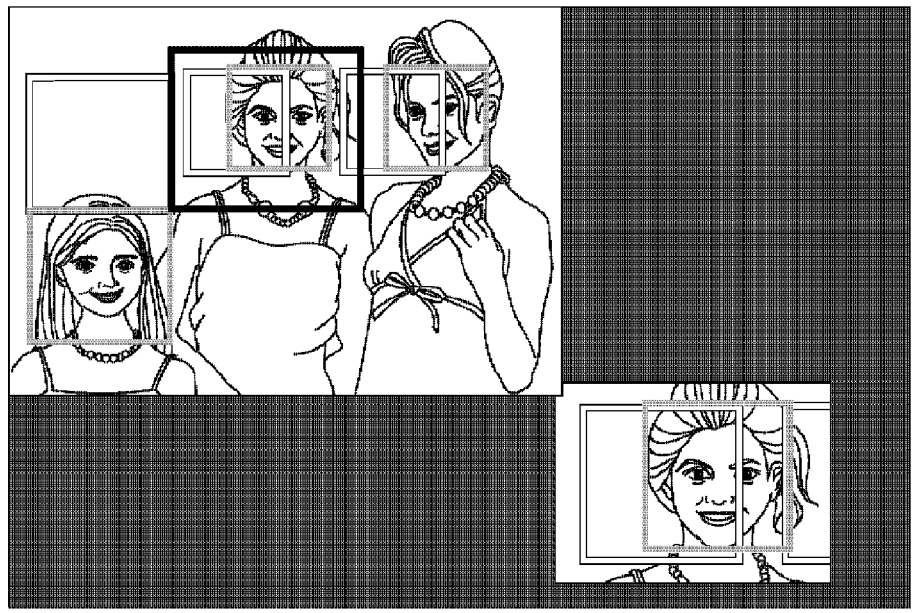
FIGS. 21A and 21B illustrate a second display example reflecting the in-focus frame information list and the during-reproducing face frame information list in the exemplary embodiment of the present invention.
Figure 21B:
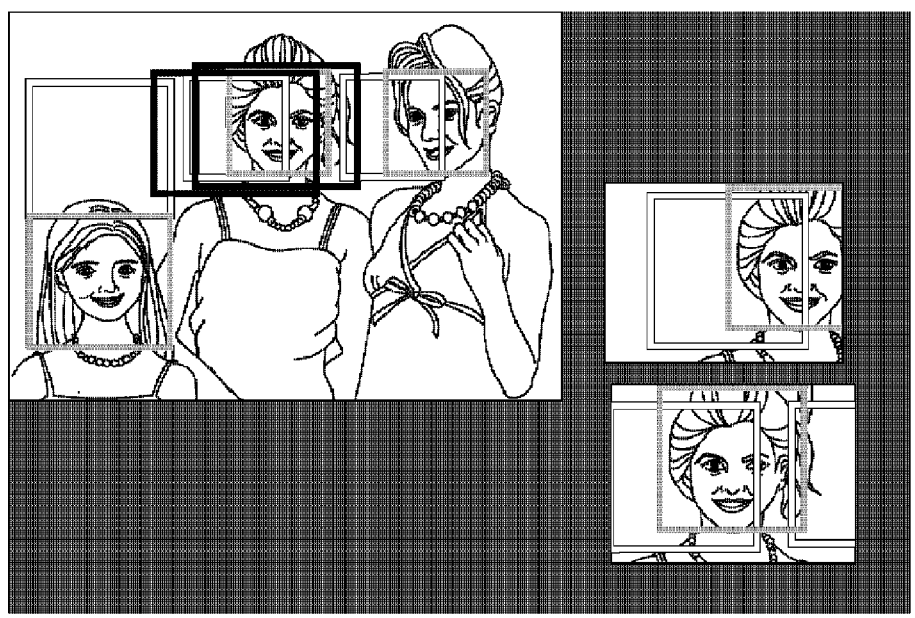

As another display method, when the correlation is high, a range including both the face frame and the in-focus frame can be displayed in an enlarged size when a display is provided at one jump to either the face frame or the in-focus frame. FIG. 21A illustrates a display screen in that case. Also, the in-focus frame and the face frame having high correlation therebetween can be simultaneously displayed in an enlarged size. FIG. 21B illustrates a display screen in that case. Such a display method can also omit the step of jumping to substantially the same objects twice and realize more efficient confirmation. Additionally, in FIGS. 21A and 21B, because the jump steps are unified while displaying both the face frame and the in-focus frame having correlation therebetween, the user can recognize which frames have the correlation.

While the correlation determination in step S1810 of FIG. 18 is made such that there is correlation between the in-focus frame and the face frame detected during reproducing when the distance between them is short, the present of correlation can also be determined for the in-focus frame and the face frame which are not overlapped with each other.

Figure 22A:
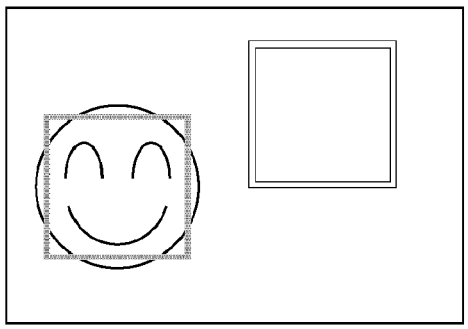
FIGS. 22A to 22D illustrate a third display example reflecting the in-focus frame information list and the during-reproducing face frame information list in the exemplary embodiment of the present invention.
Figure 22B:
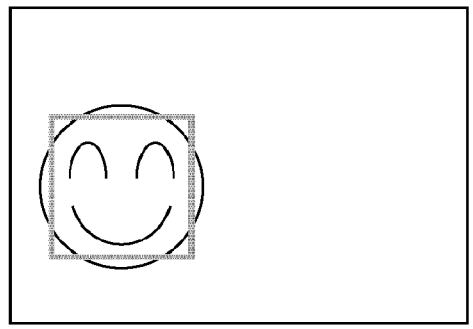
Figure 22C:
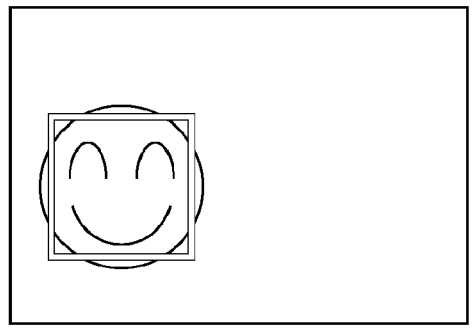

FIG. 22A illustrates an example of an image which has been captured after execution of the face priority AF and in which a face is not detected near the in-focus frame when the image is reproduced. In the image illustrated in FIG. 22A, an object is not present at the position of the in-focus frame because the photographer has changed the framing or the object has moved in itself during a period from the time of the focus adjustment with the photometry to the time of actual shooting. However, some of the face frames detected during reproducing, which has the same size as the in-focus frame, represents, with a high probability, an object that has moved within the same depth of field during a period from the time of the face priority AF to the time of actual shooting. A probability of such a face frame being in focus is also high. In that case, when the in-focus frame and the detected face frame are compared in size and a face frame having almost the same size as the in-focus frame is present, such a face frame can be determined to have correlation with the in-focus frame even if they are spaced from each other through a distance. On the other hand, the in-focus frame for which any face cannot be detected nearby is regarded as including an in-focus object with a low probability and as having low necessity of confirmation. Accordingly, the in-focus frame information list is updated to remove the relevant in-focus frame from the jump target and the display target. FIG. 22B illustrates an example displayed after updating the in-focus frame information list. Alternatively, taking into account that the face frame detected during reproducing represents an object actually made in focus with a high probability, the face frame detected during reproducing can be set as the in-focus frame to perform a jump and to present a frame display. FIG. 22C illustrates a display example in such a case. Meanwhile, even when a face can be detected near an in-focus frame set during the face priority AF, the relevant in-focus frame can be regarded as not including an in-focus object if the in-focus frame and the face frame differ in size to a large extent. Therefore, those in-focus frame and face frame can be determined to have no correlation.

Figure 22D:
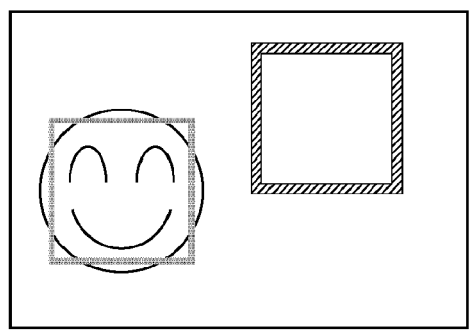

Further, regardless of correlation, when any face cannot be detected during reproducing near the in-focus frame which has been set during the face priority AF, the color and/or the shape of the in-focus frame can be changed to provide an alarm display, or the in-focus frame can be simply removed from the jump target and the frame display target, taking into account that the necessity of confirming the in-focus frame is low. FIG. 22D illustrates an example of presenting an alarm display by changing the color of the in-focus frame for which any face frame cannot be detected nearby.

In the case of the reproduced image being an image that has been captured after execution of the face priority AF, if feature information of a face detected during the face priority AF at the time of shooting is recorded, correlation can also be determined by comparing the feature information of the face detected during the face priority AF with feature information of a face detected during reproducing. If it is determined from the face detected during the face priority AF and the face detected during reproducing that both the faces represent the face of the same person, the presence of correlation can be determined. Further, by making the determination in a combined manner with conditions of the distance between the in-focus frame and the face frame and the sizes thereof, the correlation can be determined with higher accuracy.

While the above-described determination of correlation has been made, for example, with respect to the in-focus frame and the face frame detected during reproducing, the present invention is not limited to the described example and it can also be applied to the case where duplicate information is extracted for the same object at different timings. For example, when face information is detected during the shooting and red-eye information is detected during reproducing, there is a possibility that duplicate information is extracted for the same object. Even in such a case, a simplified display and more efficient confirmation of an image can be realized by presenting a display while reflecting the result of the correlation determination as described in the exemplary embodiment.

The present invention can be practiced by supplying, to a system or an apparatus, a recording medium that records program code of software for implementing the functions of the above-described exemplary embodiment. A computer (CPU or MPU) in the system or the apparatus reads and executes the program code stored in the recording medium, thereby realizing the functions of the above-described exemplary embodiment. In that case, the program code read out from the recording medium serves to implement the functions of the above-described exemplary embodiment, and the recording medium recording the program code also constitutes the present invention. Examples of the recording medium for supplying the program code include a floppy disk, a hard disk, an optical disk, a magneto-optical disk, a CD-ROM, a CD-R, a magnetic tape, a nonvolatile memory card, and a ROM.

Further, the present invention involves not only the case where the functions of the above-described exemplary embodiment are implemented by the computer executing the read-out program code, but also the case where an OS (operating system), for example, running on the computer executes part or the whole of the actual processing in accordance with instructions from the program code so as to realize the functions of the above-described exemplary embodiment.

In addition, the program code read out from the recording medium can be written in a memory which is provided in a function extension board inserted in the computer or in a function extension unit connected to the computer. Part or the whole of the actual processing can be executed by a CPU or the like, which is incorporated in the function extension board or the function extension unit, in accordance with instructions from the program code. Thus, the present invention involves the case where the functions of the above-described exemplary embodiment are implemented through the processing executed by such a CPU or the like.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-175291 filed Jul. 3, 2007, which is hereby incorporated by reference herein in its entirety.

What is claimed is:

1. An image display control apparatus including:
a first region obtaining unit adapted to obtain a part of a region of an image as a region of a first kind;
a second region obtaining unit adapted to obtain a part of a region of the image as a region of a second kind from the same image as the image from which the region of the first kind is obtained, the region of the second kind differs from the region of the first kind;
a determination unit adapted to determine a degree of overlapping between the region of the first kind and the region of the second kind which are obtained from the same image;
a selection unit adapted not to treat the region of the first kind and the region of the second kind as separately selected objects and to select only one of the regions, or both the regions at the same time, or a region including both the regions, when the determination unit determines that the degree of overlapping between the region of the first kind and the region of the second kind is greater than a defined value, and adapted to treat the region of the first kind and the region of the second kind as separately selected objects and to select each of the regions separately when the determination unit determines that the degree of overlapping between the region of the first kind and the region of the second kind is less than the defined value; and
a display control unit adapted to perform control to display the image while reflecting a selection result by the selection unit.

2. The image display control apparatus according to claim 1, wherein the region of the first kind is a region extracted when the image is captured by an image pickup apparatus, and
wherein the region of the second kind is a region extracted at timing differing from the timing when the image is captured.

3. The image display control apparatus according to claim 2, wherein the region of the first kind is one of regions subjected to focus adjustment, exposure control, white balance adjustment, and light control when the image is captured, regions in which a human face and a red eye are detected when the image is captured, and a region in which another particular object is detected by an image analysis when the image is captured.

4. The image display control apparatus according to claim 1, wherein the region of the first kind is a region extracted at timing differing from the timing when the image is reproduced, and
wherein the region of the second kind is a region extracted when the image is reproduced by a reproducing apparatus.

5. The image display control apparatus according to claim 4, wherein the region of the second kind is one of regions in which a human face and a red eye are detected when the image is reproduced, and a region in which another particular object is detected by an image analysis when the image is reproduced.

6. The image display control apparatus according to claim 1, wherein the display control unit displays the region of the first kind and the region of the second kind in a separately recognizable manner.

7. The image display control apparatus according to claim 1, wherein the display control unit performs control to display the region selected by the selection unit in a superimposed relation to the image.

8. The image display control apparatus according to claim 7, wherein the display control unit performs control to display the region of the first kind and the region of the second kind, which are determined by the determination unit to have a high degree of overlapping, in a separately recognizable manner with respect to other frames having a low degree of overlapping.

9. The image display control apparatus according to claim 7, wherein the selection unit selects a region including both of the region of the first kind and the region of the second kind, which are determined by the determination unit to have a high degree of overlapping, and
wherein the display control unit performs control to display one frame representing the region including both the regions.

10. The image display control apparatus according to claim 1, wherein the selection unit selects a region including both of the region of the first kind and the region of the second kind, which are determined by the determination unit to have a high degree of overlapping, and
wherein the display control unit cuts out and displays the region including both the regions, which has been selected by the selection unit.

11. The image display control apparatus according to claim 1, wherein the selection unit simultaneously selects both of the region of the first kind and the region of the second kind, which are determined by the determination unit to have a high degree of overlapping, and
wherein the display control unit simultaneously cuts out and displays both regions selected by the selection unit.

12. An image display method for displaying an image on a display device including:
obtaining a part of a region of an image as a region of a first kind;
obtaining a part of a region of an image as a region of a second kind from the same image as the image from which the region of the first kind is obtained, the region of the second kind differs from the obtained region of the first kind;
determining a degree of overlapping between the obtained region of the first kind and the obtained region of the second kind that are obtained from the same image;
selecting only one of the obtained regions, or both the regions at the same time, or a region including both the regions, when a determination result indicates that the degree of overlapping between the region of the first kind and the region of the second kind is greater than a defined value, wherein the region of the first kind and the region of the second kind are not treated as separately selected objects;

selecting each of the regions separately when the determination result indicates that the degree of overlapping between the region of the first kind and the region of the second kind is less than the defined value, wherein the region of the first kind and the region of the second kind are treated as separately selected objects; and performing control to display the image while reflecting a result of the selection on the display device.

13. A non-transitory computer-readable recording medium recording a program which causes an apparatus to function as:

a first region obtaining unit adapted to obtain a part of a region of an image as a region of a first kind;

a second region obtaining unit adapted to obtain a part of a region of the image as a region of a second kind from the same image as the image from which the region of the first kind is obtained, the region of the second kind differs from the region of the first kind;

a determination unit adapted to determine a degree of overlapping between the region of the first kind and the region of the second kind which are obtained from the same image;

a selection unit adapted not to treat the region of the first kind and the region of the second kind as separately selected objects and to select only one of the regions, or both the regions at the same time, or a region including both the regions, when the determination unit determines that the degree of overlapping between the region of the first kind and the region of the second kind is greater than a defined value, and adapted to treat the region of the first kind and the region of the second kind as separately selected objects and to select each of the regions separately when the determination unit determines that the degree of overlapping between the region of the first kind and the region of the second kind is less than the defined value; and a display control unit adapted to perform control to display the image while reflecting a selection result by the selection unit.

* * * * *